US009948578B2

(12) United States Patent
Subasingha et al.

(10) Patent No.: US 9,948,578 B2
(45) Date of Patent: Apr. 17, 2018

(54) DE-JITTER BUFFER UPDATE

(71) Applicant: QUALCOMM Incorporated, San Diego, CA (US)

(72) Inventors: Subasingha Shaminda Subasingha, San Diego, CA (US); Vivek Rajendran, San Diego, CA (US); Duminda Dewasurendra, San Diego, CA (US); Chandra Mouli Polisetty, San Diego, CA (US); Venkatraman S. Atti, San Diego, CA (US); Venkata Subrahmanyam Chandra Sekhar Chebiyyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 14/829,560

(22) Filed: Aug. 18, 2015

(65) Prior Publication Data
US 2016/0308791 A1 Oct. 20, 2016

Related U.S. Application Data

(60) Provisional application No. 62/147,386, filed on Apr. 14, 2015, provisional application No. 62/147,431, filed on Apr. 14, 2015.

(51) Int. Cl.
H04J 3/06 (2006.01)
H04L 12/861 (2013.01)
(Continued)

(52) U.S. Cl.
CPC ........... H04L 49/90 (2013.01); G10L 19/167 (2013.01); H04L 7/0016 (2013.01); H04L 12/56 (2013.01);
(Continued)

(58) Field of Classification Search
USPC ....... 370/216, 252, 389, 394, 412, 429, 468, 370/473, 516
See application file for complete search history.

(56) References Cited

U.S. PATENT DOCUMENTS 6,862,298 B1   3/2005 Smith et al.
7,424,026 B2   9/2008 Mallila
(Continued)

OTHER PUBLICATIONS

ETSI TS 126 448, Universal Mobile Telecommunications System (UMTS);LTE; Codec for Enhanced Voice Services (EVS); Jitter Buffer Management (3GPP TS 26.448 version 12.1.0 Release 12), Technical Specification, Jan. 2015, 3GPP TS 26.448 Version 12.1.0, Release 12, European Telecommunications Standards Institute, Sophia-Antipolis, France, pp. 1-23.*

(Continued)

Primary Examiner — Kwang B Yao
Assistant Examiner — Nguyen Ngo
(74) Attorney, Agent, or Firm — Toler Law Group, P.C.

(57) ABSTRACT

A device includes a de-jitter buffer configured to receive a packet, the packet including first data and second data. The first data includes a partial copy of first frame data corresponding to a first frame of a sequence of frames. The second data corresponds to a second frame of the sequence of frames. The device also includes an analyzer configured to, in response to receiving the packet, generate a first frame receive timestamp associated with the first data. The analyzer is also configured to, in response to receiving the packet, generate a second frame receive timestamp associated with the second data. The first frame receive timestamp indicates a first time that is earlier than a second time indicated by the second frame receive timestamp.

30 Claims, 13 Drawing Sheets

(51) Int. Cl.
  *H04L 12/54* (2013.01)
  *G10L 19/16* (2013.01)
  *H04L 7/00* (2006.01)
  *H04L 12/26* (2006.01)
  *H04L 29/06* (2006.01)

(52) U.S. Cl.
  CPC .......... *H04L 43/106* (2013.01); *H04L 65/608* (2013.01); *H04J 3/0632* (2013.01); *H04J 3/0664* (2013.01)

(56) References Cited

U.S. PATENT DOCUMENTS

| | | | |
|---|---|---|---|
| 7,924,704 B2 | 4/2011 | Dowdal et al. | |
| 8,111,720 B2 | 2/2012 | Synnergren | |
| 2007/0121597 A1* | 5/2007 | Lee | H04L 29/06027 370/356 |
| 2008/0101398 A1* | 5/2008 | Ojala | H04L 47/10 370/412 |
| 2009/0129375 A1* | 5/2009 | Mohanty | H04L 1/0006 370/356 |
| 2010/0312552 A1* | 12/2010 | Zheng | H04L 1/0009 704/219 |
| 2012/0281572 A1* | 11/2012 | Lundin | H04L 43/0852 370/252 |
| 2013/0185084 A1* | 7/2013 | Rajendran | G10L 19/04 704/500 |
| 2013/0191121 A1* | 7/2013 | Rajendran | G10L 19/00 704/229 |
| 2014/0185610 A1 | 7/2014 | Lindner | |
| 2015/0106106 A1* | 4/2015 | Atti | H04L 1/0014 704/500 |
| 2016/0028418 A1* | 1/2016 | Subasingha | H04L 1/0006 714/774 |
| 2016/0180857 A1* | 6/2016 | Reuschl | G10L 19/012 704/503 |

OTHER PUBLICATIONS

International Search Report and Written Opinion for International Application No. PCT/US2016/021869, dated Jun. 20, 2016, 13 pgs.
Perkins, C., "RTP: Audio and Video for the Internet," RTP Audio and Video for the Internet, Jun. 12, 2003, Addison Wesley Publishing, Boston, MA, pp. 1-208.
Unknown, "Universal Mobile Telecommunications System (UMTS; LTE; Codec for Enhanced Voice Services (EVS); Jitter buffer management (3GPP TS 26.448 version 12.1.0 Release 12)," Technical Specification, Jan. 2015, 3GPP TS 26.448 Version 12.1.0, Release 12, European Telecommunications Standards Institute, Sophia-Antipolis, France, pp. 1-23.

* cited by examiner

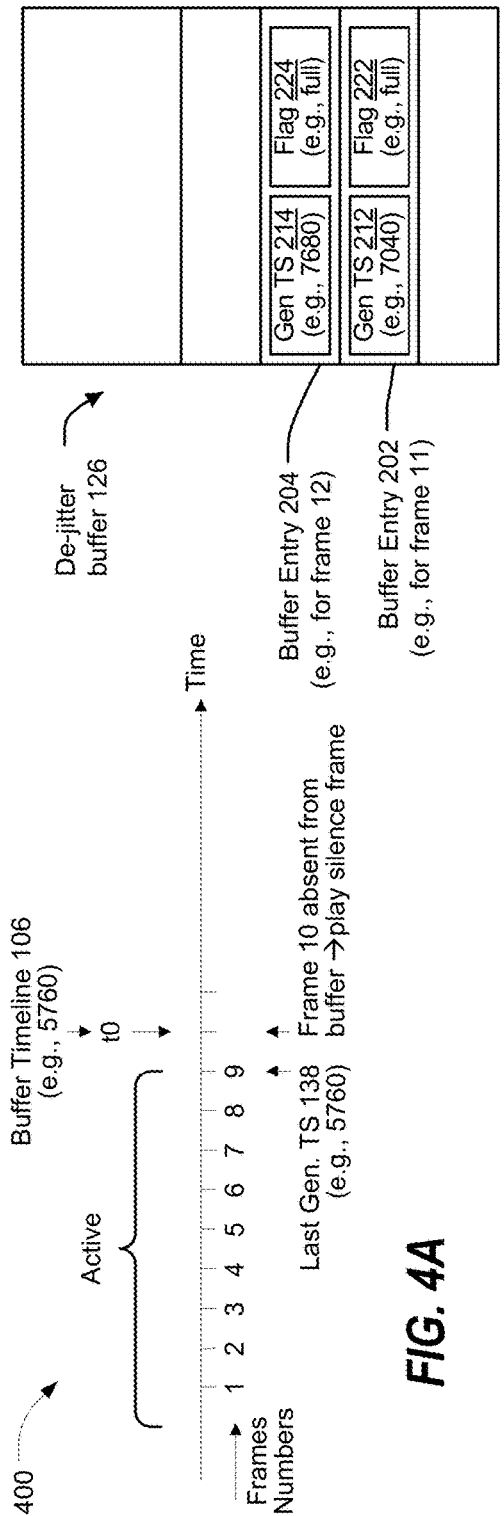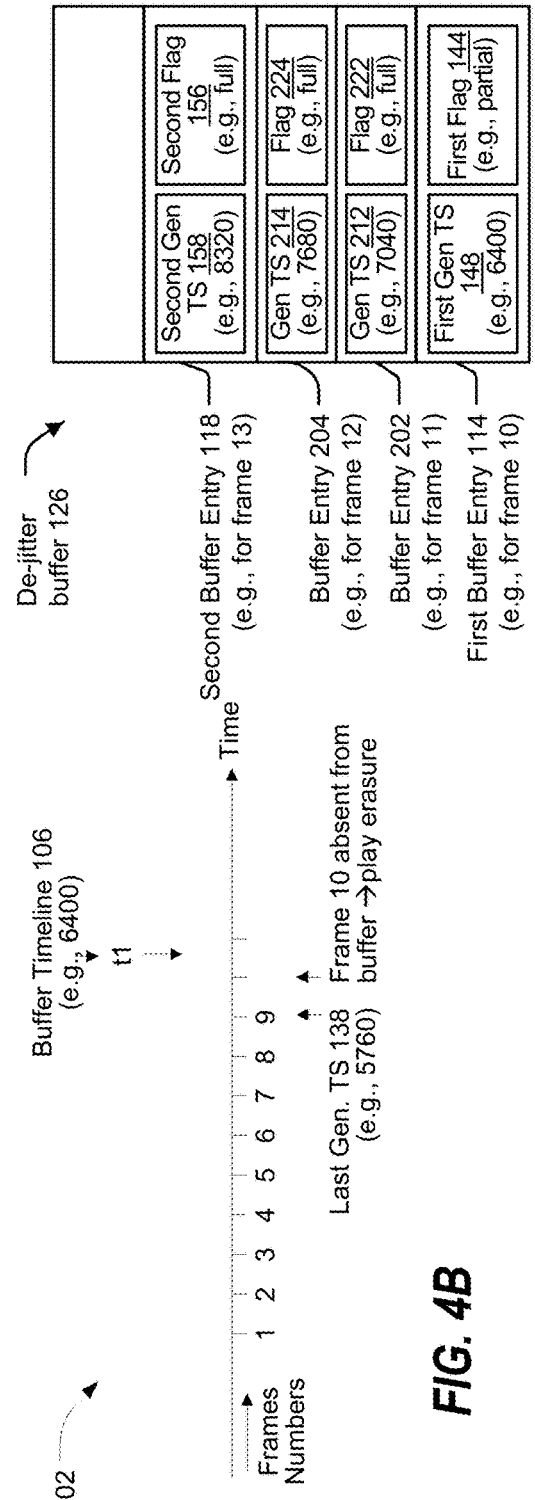

DE-JITTER BUFFER UPDATE

I. CROSS-REFERENCE TO RELATED APPLICATIONS

The present application claims the benefit of U.S. Provisional Patent Application No. 62/147,386 entitled "DE-JITTER BUFFER UPDATE," filed Apr. 14, 2015, and U.S. Provisional Patent Application No. 62/147,431 entitled "BUFFER PARAMETER ADJUSTMENT," filed Apr. 14, 2015, the contents of which are incorporated by reference in their entirety.

II. FIELD

The present disclosure is generally related to updates to a de-jitter buffer.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, may communicate voice and data packets over wireless networks. Further, many such wireless telephones include other types of devices that are incorporated therein. For example, a wireless telephone may also include a digital still camera, a digital video camera, a digital recorder, and an audio file player. Also, such wireless telephones may process executable instructions, including software applications, such as a web browser application, that may be used to access the Internet. As such, these wireless telephones may include significant computing capabilities.

Electronic devices, such as wireless telephones, may send and receive data via networks. For example, audio data may be sent and received via a circuit-switched network (e.g., the public switched telephone network (PSTN), a global system for mobile communications (GSM) network, etc.) or a packet-switched network (e.g., a voice over internet protocol (VoIP) network, a voice over long term evolution (VoLTE) network, etc.). In a packet-switched network, audio packets corresponding to a sequence of audio frames may be individually routed from a source device to a destination device. Due to network conditions, the audio packets may arrive out of order. The destination device may store received packets in a de-jitter buffer and may rearrange the received packets if the received packets are out-of-order.

The destination device may generate a processed audio signal based on the received packets. A particular packet sent by the source device may not be received, or may be received with errors, by a destination device. As a buffer depth of the de-jitter buffer increases and a buffering time of a packet prior to being processed increases, quality of a processed audio signal may improve because more packets have time to reach the destination device. However, increasing the buffer depth may increase end-to-end delay adversely impacting a user experience. Reducing the buffer depth reduces the end-to-end delay, but increases chances that the processed audio signal is generated without data for some frames of the sequence of frames because packets corresponding to the frames have not reached the destination device in time.

IV. SUMMARY

In a particular aspect, a device includes a de-jitter buffer and an analyzer. The de-jitter buffer is configured to receive a packet that includes first data and second data. The first data includes a partial copy of first frame data corresponding to a first frame of a sequence of frames. The second data corresponds to a second frame of the sequence of frames. The analyzer is configured to, in response to receiving the packet, generate a first frame receive timestamp associated with the first data and a second frame receive timestamp associated with the second data. The first frame receive timestamp indicates a first time that is earlier than a second time indicated by the second frame receive timestamp.

In another aspect, a method includes receiving a packet at a de-jitter buffer. The packet includes first data and second data. The first data includes a partial copy of first frame data corresponding to a first frame of a sequence of frames. The second data corresponds to a second frame of the sequence of frames. The method also includes, in response to receiving the packet, generating a first frame receive timestamp associated with the first data and generating a second frame receive timestamp associated with the second data. The first frame receive timestamp indicates a first time that is earlier than a second time indicated by the second frame receive timestamp.

In another aspect, a computer-readable storage device stores instructions that, when executed by a processor, cause the processor to perform operations including receiving a packet at a de-jitter buffer. The packet includes first data and second data. The first data includes a partial copy of first frame data corresponding to a first frame of a sequence of frames. The second data corresponds to a second frame of the sequence of frames. The operations also include, in response to receiving the packet, generating a first frame receive timestamp associated with the first data and generating a second frame receive timestamp associated with the second data. The first frame receive timestamp indicates a first time that is earlier than a second time indicated by the second frame receive timestamp.

In another aspect, a device includes means for receiving a packet including first data and second data. The first data includes a partial copy of first frame data corresponding to a first frame of a sequence of frames. The second data corresponds to a second frame of the sequence of frames. The device also includes means for performing buffer management, including means for generating a first frame receive timestamp associated with the first data in response to receiving the packet and means for generating a second frame receive timestamp associated with the second data in response to receiving the packet. The first frame receive timestamp indicates a first time that is earlier than a second time indicated by the second frame receive timestamp.

Other aspects, advantages, and features of the present disclosure will become apparent after review of the application, including the following sections: Brief Description of the Drawings, Detailed Description, and the Claims.

V. BRIEF DESCRIPTION OF THE DRAWINGS

FIG. 4A is a diagram illustrating operation of a particular example of the system of FIG. 1;

FIG. 4B is a diagram illustrating operation of a particular example of the system of FIG. 1;

Figure 10:
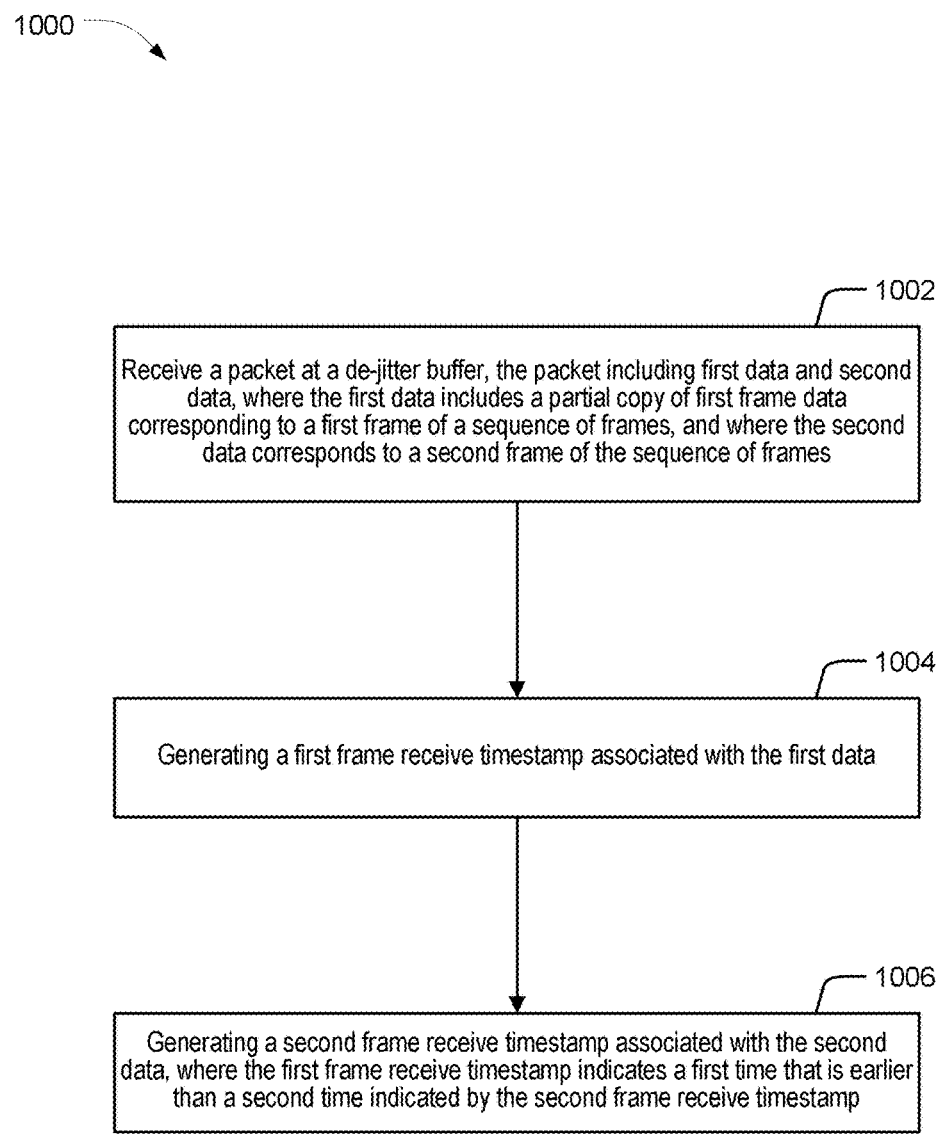
Figure 11:
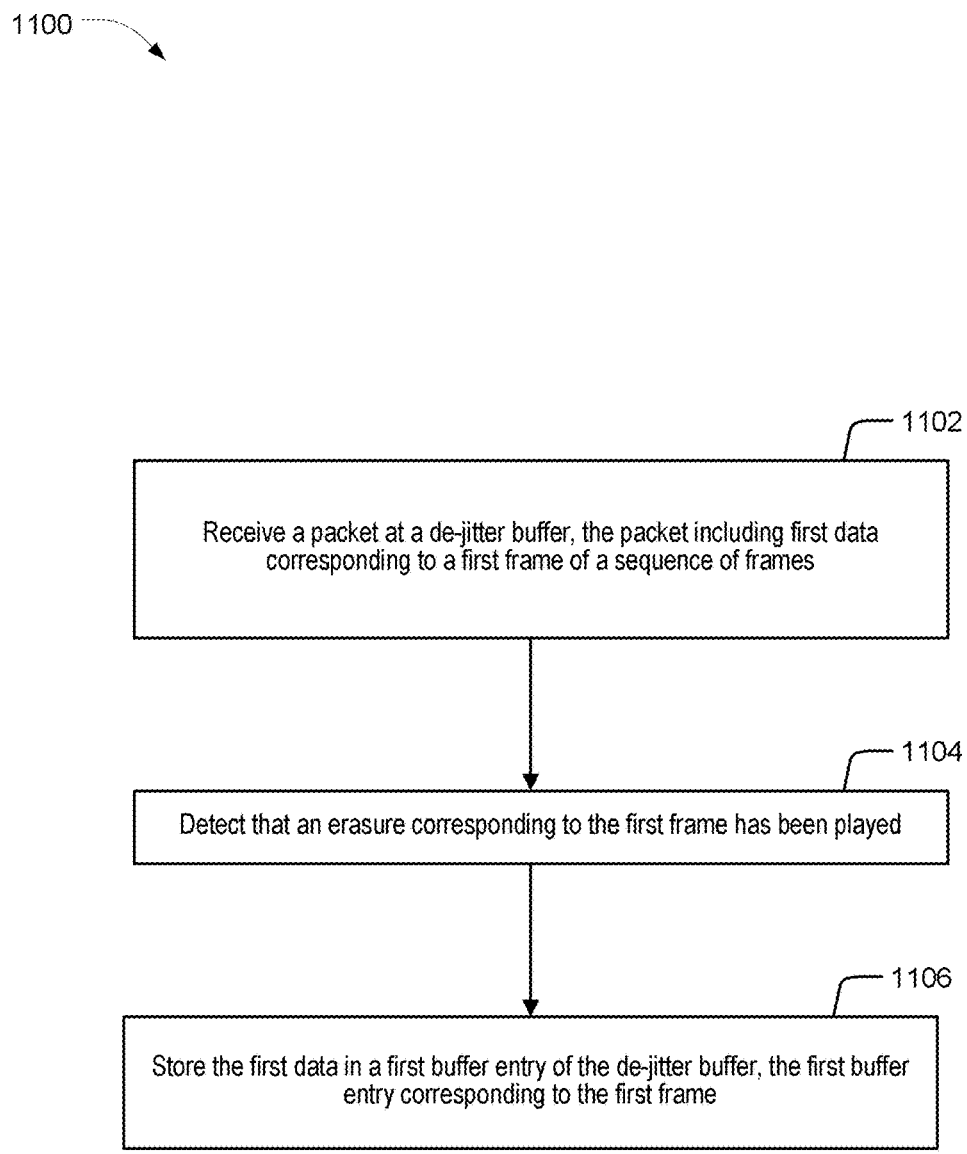
Figure 12:
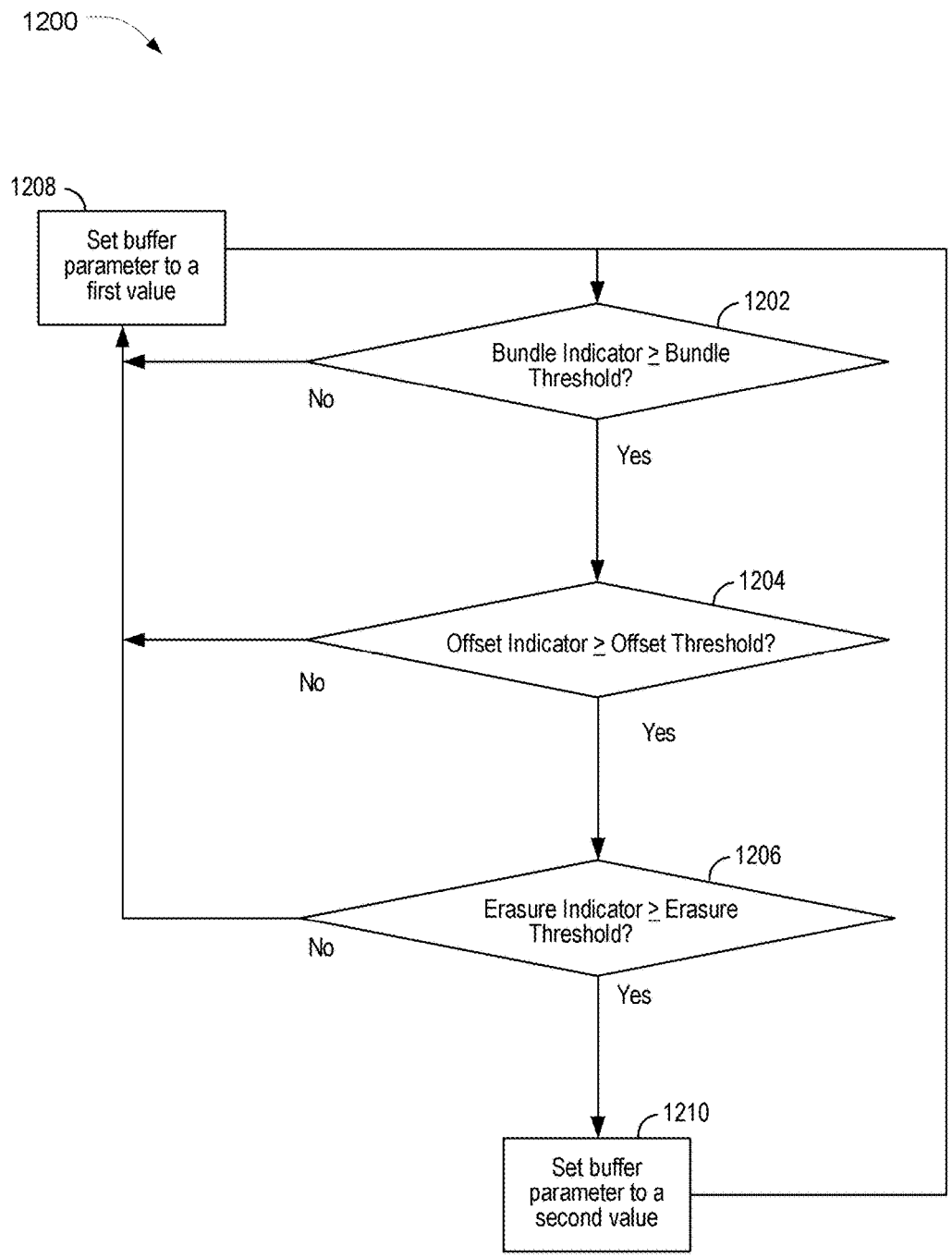
Figure 13:
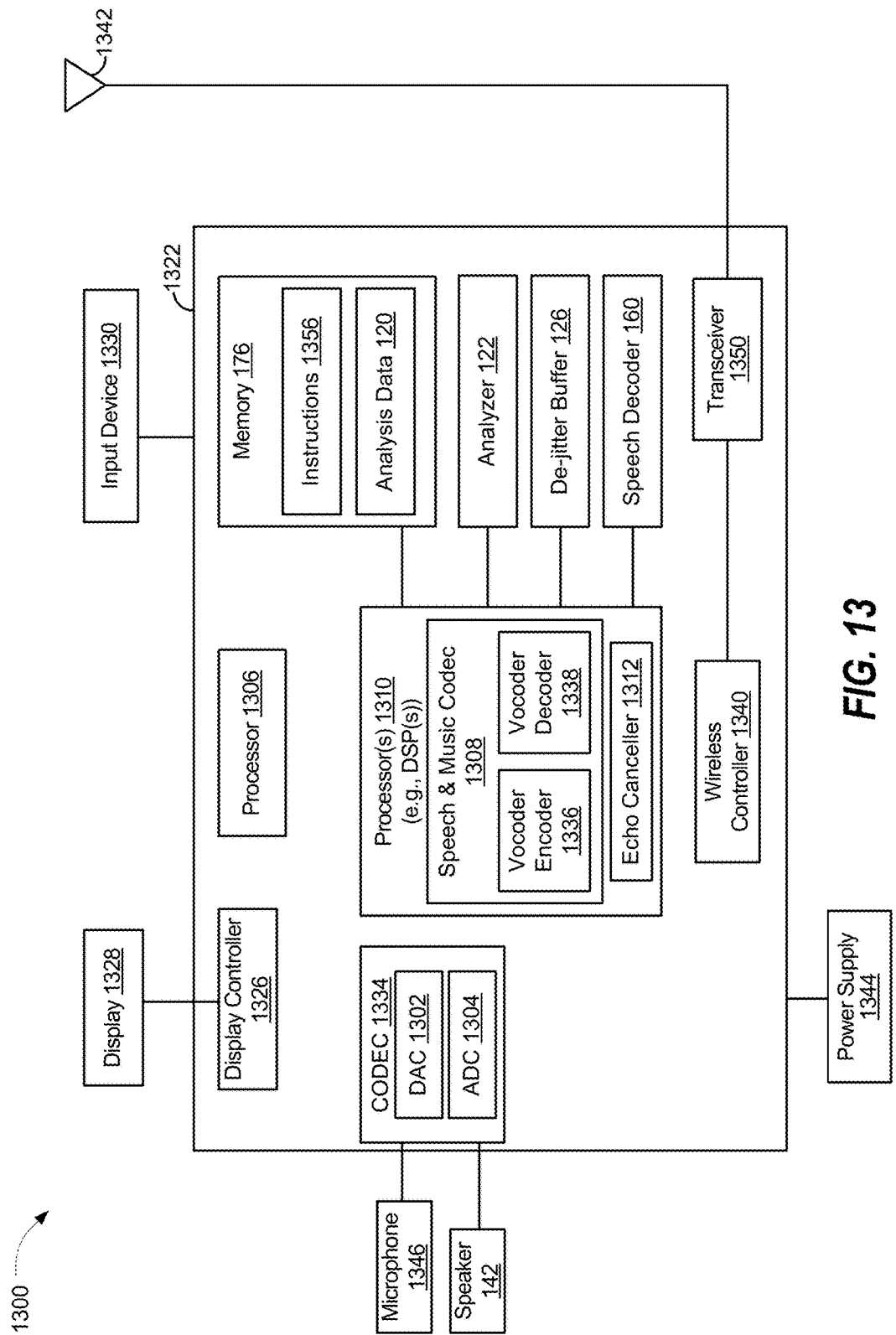

FIG. 10 a flow chart illustrating a particular method of updating a de-jitter buffer;

FIG. 11 a flow chart illustrating a particular method of updating a de-jitter buffer;

FIG. 12 is a flow chart illustrating a particular method of adjusting a buffer parameter; and FIG. 13 is a block diagram of a particular illustrative example of a device that is operable to update a de-jitter buffer.

VI. DETAILED DESCRIPTION

Particular aspects of the present disclosure are described below with reference to the drawings. In the description, common features are designated by common reference numbers throughout the drawings.

Systems and methods of updating a de-jitter buffer are disclosed. A source device may send packets to a destination device. For example, a first user at the destination device may be engaged in a voice call with a second user at the source device. During the voice call, the second user may speak into a microphone coupled to, or included in, the source device. The source device may receive an input audio signal corresponding to speech of the second user. The input audio signal may correspond to a sequence of audio frames. For example, the sequence of audio frames may include a first frame and a second frame. The source device may generate packets corresponding to the sequence of audio frames. For example, the source device may generate a first packet including first frame data corresponding to the first frame. To illustrate, the first frame data may include first speech parameters of the first frame. As another example, the source device may generate a second packet including second frame data corresponding to the second frame. To illustrate, the second frame data may include second speech parameters of the second frame.

The packets may have partial redundancy. For example, the second packet may include a partial copy (e.g., partial data) of the first packet. To illustrate, the second packet may include a subset of the first speech parameters. In a particular example, the partial data may indicate a difference between the first speech parameters and the second speech parameters.

The first packet may include a first generation timestamp (e.g., a real-time transport protocol (RTP) timestamp) corresponding to the first frame. The second packet may include a second generation timestamp (e.g., an RTP timestamp) corresponding to the second frame. The first generation timestamp and the second generation timestamp may indicate that the first frame occurs earlier in the sequence of audio frames than the second frame. The source device may send the packets (e.g., the first packet and the second packet) corresponding to the sequence of frames to the destination device. The source device may encode or attach a particular generation timestamp to a particular packet. The source device may determine the particular generation timestamp based on a clock of the source device, which may or may not be synchronized with a clock of the destination device. Additionally or alternatively, the source device may determine the particular generation timestamp based on a number of samples encoded by the source device. In some examples, generation timestamps are represented in terms of RTP units. The generation timestamp may indicate an order of the sequence of frames.

The destination device may receive one or more packets from the source device. The destination device may store the received packets in a buffer (e.g., a de-jitter buffer) and may rearrange the packets if the packets are received out-of-order. The destination device may process each particular frame in the de-jitter buffer after data corresponding to the particular frame has been buffered for a minimum duration (e.g., a playout delay). The delay in processing the particular frame may increase chances that packets corresponding to subsequent frames are in the de-jitter buffer when the subsequent frames are to be processed.

In some instances, the destination device may receive the second packet prior to receiving the first packet. The first packet may be received after the second packet or may not be received (e.g., the first packet may be lost). The destination device may dual-enqueue the second packet in response to determining that the second packet includes the partial data corresponding to the first frame. For example, the destination device may, upon receiving the second packet, determine whether the first frame is absent from the de-jitter buffer. The destination device may, in response to determining that the first frame is absent, determine whether a most recently processed frame is prior to the first frame in the sequence of frames. The destination device may buffer a first copy of the second packet corresponding to the first frame in response to determining that the most recently processed frame is prior to the first frame in the sequence of frames. The destination device may, upon receiving the second packet, buffer a second copy of the second packet corresponding to the second frame.

The destination device may process frames from the de-jitter buffer. For example, the destination device may determine that a next frame to be processed is the first frame based on the first generation timestamp of the first frame. If the first packet has not been received in time for playout of the first frame, the destination device may process the partial data from the second packet. The destination device may generate a processed speech signal based on the partial data. The processed speech signal generated based on the partial data may have better audio quality than a processed speech signal generated without any data corresponding to the first frame.

The destination device may buffer the first copy of the second packet by adding (or updating) a first buffer entry in the de-jitter buffer. The first buffer entry may include (or indicate a location of) the first copy of the second packet. The first buffer entry may be associated with the first frame. For example, the first buffer entry may indicate the first generation timestamp. Dual-enqueuing the second packet such that the partial data is stored in a buffer entry (e.g., the first buffer entry) that corresponds to the first frame may enable the destination device to process the partial data more efficiently without determining that the first packet including the first frame data is lost (or has not been received). For example, without dual-enqueuing, the destination device may determine that the first packet is lost in response to determining that there is no buffer entry corresponding to the first frame in the de-jitter buffer when the first frame is the next frame to be processed. The destination device may, in response to the determination that the first packet is lost, determine whether the de-jitter buffer includes another buffer entry that includes the partial data corresponding to the first frame. The destination device may process the other buffer entry in response to determining that the other buffer entry includes the partial data. With dual-enqueuing, the destination device may process the first buffer entry in response to determining that the first frame is the next frame to be processed (e.g., without searching the de-jitter buffer for a partial copy of the first frame).

The destination device may process the partial data to balance the benefits of having the playout delay (e.g., a minimum playout delay) and the disadvantages of delayed processing. The benefits of having the playout delay may include increasing a likelihood that packets associated with subsequent frames have been received at a time that the subsequent frames are to be processed. The disadvantages of delayed processing may include increased end-to-end delay.

The destination device may play an erasure in response to determining that a frame is absent from the de-jitter buffer. For example, the destination device may play an erasure corresponding to the first frame prior to receiving the second packet. The destination device may process the first frame (e.g., the partial data) subsequent to playing the erasure corresponding to the first frame in response to determining that a frame subsequent to the first frame in the sequence of frames has not been processed. For example, the destination device may process the first frame (e.g., the partial data) in response to determining that a most recently processed frame is prior to the first frame in the sequence of frames.

Processing the first frame (e.g., the partial data) subsequent to playing the erasure corresponding to the first frame may enable implicit buffer adaptation (IBA). For example, a buffer depth of the de-jitter buffer may be implicitly increased (e.g., by 1 frame) by buffering the partial data of the first frame subsequent to playing an erasure corresponding to the first frame. The erasure corresponding to the first frame may be played at a time t0 and the partial data corresponding to the first frame may be processed at a time t1. A subsequent frame (e.g., the second frame) that was to be processed at the time t1 may be processed at a time t2. A processing delay (e.g., from the time t1 to the time t2) of the subsequent frame may correspond to a playout duration (e.g., 20 milliseconds) of the first frame. Processing of frames (e.g., a third frame) following the subsequent frame (e.g., the second frame) may also be delayed by the processing delay. The de-jitter buffer may store frame data of subsequent frames (e.g., the second frame and the third frame) for an additional time corresponding to the processing delay. The de-jitter buffer may store frame data corresponding to more frames as a result of the implicit buffer adaptation. For example, keeping the subsequent frame (e.g., the second frame) in the de-jitter buffer from the time t1 to the time t2 instead of removing the subsequent frame at the time t1 may increase a number of frames stored in the de-jitter buffer after the time t1 (e.g., by 1 frame).

In a particular example, the depth of the de-jitter buffer may revert (e.g., reduce by 1 frame) after a subsequent period of silence in the input audio signal. For example, the destination device may process a subsequent frame after the period of silence in response to determining that a buffering period associated with the subsequent frame has expired (e.g., without the additional delay). The processed audio signal may include a shorter silence than the input audio signal.

As a result of the implicit buffer adaptation, the depth of the de-jitter buffer may adjust dynamically to changing network conditions. For example, the depth of the de-jitter buffer may increase (e.g., by 1 frame) when network conditions (e.g., congestion or packet loss) cause a frame (e.g., partial data of the frame) to be received subsequent to processing of an erasure corresponding to the frame. As another example, the depth of the de-jitter buffer may revert (e.g., decrease by 1 frame) after a subsequent silence.

Figure 1:
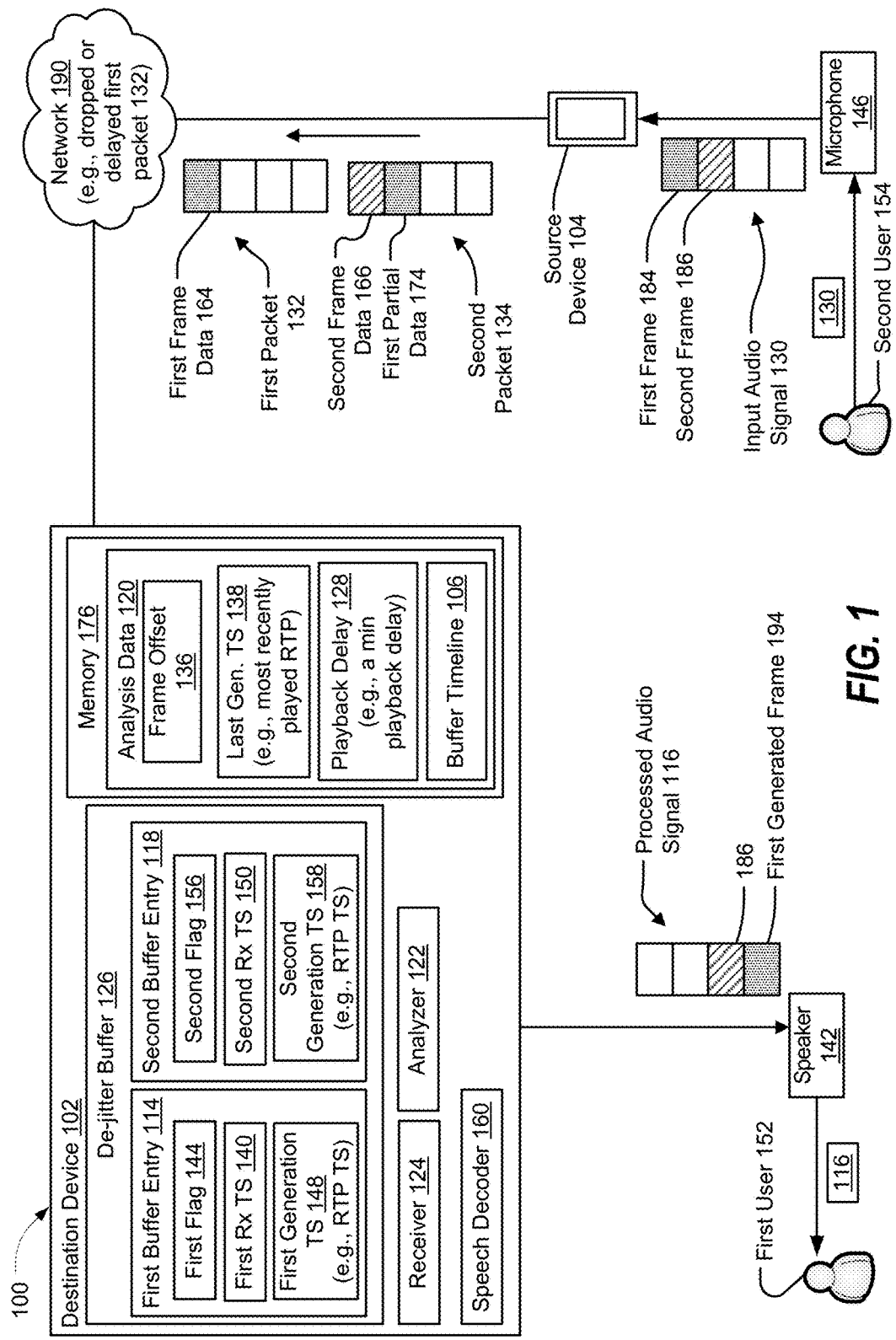
FIG. 1 is a block diagram of a particular illustrative example of a system that is operable to update a de-jitter buffer.

Referring to FIG. 1, a particular illustrative example of a system operable to update a de-jitter buffer is disclosed and generally designated 100. The system 100 may include a destination device 102 in communication with one or more other devices (e.g., a source device 104) via a network 190. The source device 104 may be coupled to or in communication with a microphone 146. For example, the source device 104 may include the microphone 146. The destination device 102 may be coupled to a speaker 142. The destination device 102 may include an analyzer 122 coupled to, or in communication with, a memory 176. The destination device 102 may include a receiver 124, a de-jitter buffer 126, a speech decoder 160, or a combination thereof. In a particular implementation, the analyzer 122 may be configured to operate as an interface module between the de-jitter buffer 126 and the speech decoder 160. The memory 176 may be configured to store analysis data 120. The analysis data 120 may include a frame offset 136 (e.g., greater than or equal to 1 frame), a last generation timestamp 138, a playout delay 128, a buffer timeline 106, or a combination thereof.

The destination device 102 may include fewer or more components than illustrated in FIG. 1. For example, the destination device 102 may include one or more processors, one or more memory units, or both. The destination device 102 may include a networked or a distributed computing system. For example, the memory 176 may be a networked or a distributed memory. In a particular illustrative example, the destination device 102 may include a communication device, a headset, a decoder, a smart phone, a cellular phone, a mobile communication device, a laptop computer, a computer, a tablet, a personal digital assistant (PDA), a set top box, a video player, an entertainment unit, a display device, a television, a gaming console, a music player, a radio, a digital video player, a digital video disc (DVD) player, a tuner, a camera, a navigation device, or a combination thereof.

During operation, a first user 152 may be engaged in a voice call with a second user 154. The first user 152 may use the destination device 102 and the second user 154 may use the source device 104 for the voice call. During the voice call, the second user 154 may speak into the microphone 146 coupled to the source device 104. An input audio signal 130 may correspond to a portion of a word, a word, or multiple words spoken by the second user 154. The input audio signal 130 may correspond to a sequence of audio frames. For example, the sequence of audio frames may include a first frame 184 and a second frame 186. The first frame 184 (e.g., an audio frame N) may be earlier in the sequence of audio frames than the second frame 186 (e.g., an audio frame N+3). The source device 104 may receive the input audio signal 130, via the microphone 146, from the second user 154. In a particular implementation, the microphone 146 may capture an audio signal and an analog-to-digital converter (ADC) may convert the captured audio signal from an analog waveform into a digital signal comprised of digital audio samples. The digital audio samples may be "compressed" by a vocoder (a voice encoder-decoder). An encoder of the vocoder may compress the digital audio samples and form a sequence of packets (e.g., a first packet 132 and a second packet 134). The first packet 132 may include first frame data 164 corresponding to the first frame 184. The second packet 134 may include second frame data 166 corresponding to the second frame 186.

The first packet 132 may indicate a first generation timestamp (e.g., an RTP timestamp) of the first frame 184. The second packet 134 may indicate a second generation timestamp (e.g., an RTP timestamp) of the second frame 186. The first generation timestamp and the second generation timestamp may indicate that the first frame 184 is earlier in the sequence of audio frames than the second frame 186. The first generation timestamp and the second generation timestamp may be generated by the source device 104. The source device 104 may determine the particular generation timestamp based on a clock of the source device 104 (which may or may not be synchronized with a clock of the destination device 102). Additionally or alternatively, the source device 104 may determine the particular generation timestamp based on a number of samples encoded by the source device 104. In particular examples, the generation timestamp is represented in terms of RTP units. The source device 104 may encode or attach the first generation timestamp to the first packet 132 and encode or attach the second generation timestamp to the second packet 134. The generation timestamp may indicate an order of the sequence of frames.

In some implementations, one or more packets may have partial redundancy. For example, a subsequent packet (e.g., the second packet 134) may include redundant data (e.g., a partial copy of the first frame data 164) that may be used to reconstruct a previous audio frame (e.g., the audio frame N). For example, the second packet 134 may include first partial data 174 corresponding to at least a portion of the first frame data 164 to enable reproduction of the first frame 184, although possibly at a reduced resolution as compared to using the first frame data 164. In a particular implementation, the redundant data (e.g., the first partial data 174) may correspond to a "critical" speech frame. For example, a loss of the critical speech frame may cause a significant quality impact (e.g., a quality impact that is noticeable to a user) in a processed speech signal generated at the destination device 102.

In a particular implementation, the source device 104 and the destination device 102 may operate on a constant-bit-rate (e.g., 13.2 kilobit per second (kbps)) channel. In this implementation, a primary frame bit-rate corresponding to primary data (e.g., the second frame data 166) may be reduced (e.g., to 9.6 kbps) to accommodate the redundant data (e.g., the first partial data 174). For example, a remaining bit-rate (e.g., 3.6 kbps) of the constant-bit-rate may correspond to the redundant data. In a particular example, the reduction of the primary frame bit-rate may be performed at the source device 104 depending on characteristics of the input audio signal 130 to have reduced impact on overall speech quality. The source device 104 may transmit the sequence of packets (e.g., the first packet 132, the second packet 134, or both) to the destination device 102 via the network 190.

The destination device 102 may receive one or more packets (e.g., the first packet 132, the second packet 134, or both) of the sequence of packets. The analyzer 122 may store the packets (e.g., the first packet 132, the second packet 134, or both) received by the destination device 102 in the de-jitter buffer 126. For example, the analyzer 122 may receive the packets from the destination device 102 and may store the packets in the de-jitter buffer 126. In a particular example, the packets may be received out-of-order at the destination device 102. The analyzer 122 may reorder one or more packets in the de-jitter buffer 126 if the packets are out-of-order. One or more packets of the sequence of packets sent by the source device 104 may not be received, or may be received with errors, by the destination device 102. For example, a packet (e.g., the first packet 132) may not be received due to packet loss or may be partially received, due to network conditions, by the receiver 124.

In some circumstances, the destination device 102 may receive the second packet 134 and may not receive the first packet 132 or may receive the second packet 134 prior to receiving the first packet 132. In such circumstances, the destination device 102 may receive the second packet 134 from the receiver 124 and may provide the second packet 134 to the analyzer 122. The analyzer 122 may dual-enqueue (e.g., insert multiple copies of) the second packet 134 in the de-jitter buffer 126 upon receiving the second packet 134. For example, the analyzer 122 may store a first copy of the second packet 134 in a first buffer entry 114 for the first frame 184 in response to determining that the first frame 184 is absent from the de-jitter buffer 126 and that the second packet 134 includes the first partial data. The analyzer 122 may also store a second copy of the second packet 134 in a second buffer entry 118 for the second frame 186. The analyzer 122 may set a first flag 144 of the first buffer entry 114 to a particular value (e.g., 1) to indicate that the first buffer entry 114 corresponds to a partial copy of frame data of a frame. The analyzer 122 may set a second flag 156 of the second buffer entry 118 to a particular value (e.g., 0) to indicate that the second buffer entry 118 corresponds to a full copy of frame data of a frame.

In a particular implementation, the analyzer 122 may determine a frame offset 136 (e.g., the number of packets between a partial frame and a corresponding full frame) by parsing a packet. The analyzer 122 may parse the packet to determine the frame offset 136 in response to determining the packet contains a partial copy of frame data of a frame. For example, the analyzer 122 may parse the second packet 134 to determine a first frame offset (e.g., 1) of the first partial data 174, the first frame offset indicating that the first partial data 174 corresponds to the first frame 184. Additionally or alternatively, the second frame data 166 may include or indicate the frame offset 136. In other particular implementations, the frame offset 136 may be any number greater than 1, such as 2, 3, or 5.

The analyzer 122 may determine a second generation timestamp 158 based on the second generation timestamp of the second frame 186 indicated by the second packet 134. The analyzer 122 may store the second generation timestamp 158 in the second buffer entry 118. The analyzer 122 may determine a first generation timestamp 148 based on the second generation timestamp 158 and the frame offset 136 (e.g., the first generation timestamp 148=(the second generation timestamp 158−(the frame offset 136*a number of samples per frame)). The analyzer 122 may store the first generation timestamp 148 in the first buffer entry 114. In a particular example, the second packet 134 may indicate the frame offset 136, the number of samples per frame (e.g., 640 samples per frame), or both.

The analyzer 122 may determine a second receive timestamp 150 of the second frame 186 based on a receive timestamp of the second packet 134. The analyzer 122 may store the second receive timestamp 150 in the second buffer entry 118. A receive timestamp (which may also be referred to as a frame receive timestamp) may indicate a time when a frame is available to or received by the destination device 102. A receive timestamp may also be adjusted to indicate a past time (e.g., when the particular frame should have been available or should have been received). The receive timestamp may be generated by the destination device 102 based on a clock of the destination device 102 (which may or may not be synchronized with a clock of the source device 104). Additionally or alternatively, the receive timestamp may be based on a number of samples indicated (e.g., a number of samples encoded) by the source device 104.

The analyzer 122 may generate a receive timestamp of a particular frame (e.g., a partial frame) of a packet (e.g., a partially redundant packet) by adjusting a receive timestamp of the packet to indicate a past time (e.g., when the particular frame should have been available or should have been received). For example, the analyzer 122 may generate a first receive timestamp 140 of the first frame 184 based on the receive timestamp of the second packet 134 and based on the frame offset 136. The analyzer 122 may determine a particular duration by multiplying the frame offset 136 with a frame playout duration. The analyzer 122 may generate the first receive timestamp 140 by subtracting at least the particular duration from the receive timestamp of the second packet 134. To illustrate, the analyzer 122 may determine the first receive timestamp 140 based on the equation: FRTS=PRTS−(FO*FPD)−1 millisecond, where FRTS=the first receive timestamp 140, PRTS=the receive timestamp of the second packet 134, FO=the frame offset 136, and FPD=a frame playout duration. In a particular implementation, the second packet 134 may indicate the frame offset 136 (e.g., 3), the frame playout duration (e.g., 20 milliseconds (ms)), or both. The analyzer 122 may store the first receive timestamp 140 in the first buffer entry 114. The first receive timestamp 140 may indicate a first time that is earlier than a second time indicated by the second receive timestamp 150.

In a particular example, the analyzer 122 may store the first copy of the second packet 134 in a first location of the memory 176 and may store the second copy of the second packet 134 in a second location of the memory 176. The first buffer entry 114 may indicate (e.g., include a first pointer to) the first location. The second buffer entry 118 may indicate (e.g., include a second pointer to) the second location.

The analyzer 122 may process the first buffer entry 114 corresponding to the first frame 184 at a first playout time, as described herein. The analyzer 122 may provide the first partial data 174 to the speech decoder 160. In a particular implementation, the analyzer 122 may provide the first partial data 174 to the speech decoder 160 in response to receiving a request for the first frame 184 from the speech decoder 160. The analyzer 122 may process the second buffer entry 118 corresponding to the second frame 186 at a second playout time, as described herein. The analyzer 122 may provide the second frame data 166 to the speech decoder 160. In a particular implementation, the analyzer 122 may provide the second frame data 166 to the speech decoder 160 in response to receiving a request for the second frame 186 from the speech decoder 160. The speech decoder 160 may generate a processed audio signal 116 based on the first partial data 174 and the second frame data 166. For example, the speech decoder 160 may generate a first generated frame 194 based on the first partial data 174 and may generate the second frame 186 based on the second frame data 166. The processed audio signal 116 may correspond to the first generated frame 194 and the second frame 186. The speech decoder 160 may output the processed audio signal 116, via the speaker 142, to the first user 152.

In a particular example, the first frame data 164 may correspond to first speech parameters of the first frame 184. The first partial data 174 may include a subset of the first speech parameters. In another particular example, the second frame data 166 may correspond to second speech parameters of the second frame 186 and the first partial data 174 may correspond to a difference between the first speech parameters and the second speech parameters. In this example, the analyzer 122 may generate the first speech parameters based on a sum of the second speech parameters and the first partial data 174. The analyzer 122 may generate the processed audio signal 116 based on the first speech parameters. It will be appreciated that the processed audio signal 116 may be generated based on the first speech parameters even when the first packet 132 is missing from the de-jitter buffer 126. In a particular example, the analyzer 122 may provide the second packet 134, the first partial data 174, the second frame data 166, the first speech parameters, the second speech parameters, or a combination thereof, to the speech decoder 160, and the speech decoder 160 may generate the processed audio signal 116. The processed audio signal 116 generated using the first partial data 174 to compensate for the lost packet (e.g., the first packet 132) may have a better audio quality than a processed speech signal generated based only on the second frame data 166. For example, the processed audio signal 116 may have fewer user perceptible artifacts than the processed speech signal generated based on the second frame data 166 and not based on the first frame data 164 (or the first partial data 174).

In a particular implementation, the analyzer 122 may refrain from processing each particular frame in the de-jitter buffer 126 until a buffering period corresponding to the particular frame has expired. The analyzer 122 may determine the buffering period corresponding to the particular frame based on a receive timestamp of the particular frame and the playout delay 128 (e.g., a minimum playout delay).

Storing the first receive timestamp 140 in the first buffer entry 114 may cause a first buffering period corresponding to the first frame 184 to expire prior to expiration of a second buffering period corresponding to the second frame 186. For example, the analyzer 122 may determine the first buffering period based on a sum of the first receive timestamp 140 and the playout delay 128. The analyzer 122 may determine the second buffering period based on a sum of the second receive timestamp 150 and the playout delay 128. The first receive timestamp 140 may indicate a first time that is earlier than a second time indicated by the second receive timestamp 150. The analyzer 122 may process the first buffer entry 114 (e.g., the first partial data 174) at a first playout time in response to determining that the buffering period corresponding to the first frame 184 has expired, although the buffering period corresponding to the second frame 186 may still be ongoing. For example, the first playout time of the first frame 184 may be earlier than a second playout time of the second frame 186.

The analyzer 122 may maintain the buffer timeline 106 to track frames that have been played and to indicate a next frame to be processed. The buffer timeline 106 may indicate that the next frame to be processed has a particular generation timestamp that is next after the generation timestamp indicated by the buffer timeline 106. For example, as frames are processed and removed from the de-jitter buffer 126, the analyzer 122 may update or set a value of the buffer timeline 106 (e.g., an RTP timeline) to indicate a generation timestamp (e.g., an RTP timestamp) of a particular frame in response to processing the particular frame. The analyzer 122 may also, or in the alternative, update the last generation timestamp 138 to indicate the generation timestamp of the particular frame in response to processing the particular frame. The analyzer 122 may maintain the last generation timestamp 138 to track a generation timestamp of a most recently processed frame.

Loss of packets, or silence in the input audio signal 130, may cause the buffer timeline 106 to differ from the last generation timestamp 138. For example, the analyzer 122 may play an erasure in response to determining that the particular frame is absent from the de-jitter buffer 126. The analyzer 122 may update (e.g., increment) the value of the buffer timeline 106 based on the frame playout duration (e.g., 20 ms) in response to playing the erasure. In this example, the value of the buffer timeline 106 may exceed the last generation timestamp 138. In a particular implementation, the analyzer 122 may play an erasure by providing a particular input to the speech decoder 160 indicating that the particular frame is absent from the de-jitter buffer 126. In a particular implementation, the analyzer 122 may process a particular buffer entry (e.g., the first buffer entry 114) at a particular playout time in response to determining that a corresponding buffering period (e.g., the first buffering period) has expired and that a value of the buffer timeline 106 indicates that a corresponding frame (e.g., the first frame 184) is the next frame to be processed.

In a particular implementation, the analyzer 122 may store a copy of a particular packet in the de-jitter buffer 126 for a particular frame in response to determining that a generation timestamp (e.g., an RTP timestamp) of the particular frame exceeds a generation timestamp of a most recently processed frame. For example, the analyzer 122 may include the second packet 134 in the second buffer entry 118 in response to determining that the second generation timestamp 158 exceeds the last generation timestamp 138, indicating that the most recently processed frame is earlier in the sequence of audio frames than the second frame 186. As another example, the analyzer 122 may include the second packet 134 in the first buffer entry 114 in response to determining that the first generation timestamp 148 exceeds the last generation timestamp 138, indicating that the most recently processed frame is earlier in the sequence of audio frames than the first frame 184.

The analyzer 122 may update the de-jitter buffer 126 to store a copy of a particular packet for a particular frame independent of the value of the buffer timeline 106 when a generation timestamp of the particular frame exceeds the last generation timestamp 138. For example, the first generation timestamp 148 may be less than or equal to the value of the buffer timeline 106, indicating that the analyzer 122 has played an erasure corresponding to the first frame 184 (e.g., the first frame data 164 or the first partial data 174 was received in the de-jitter buffer 126 after a playout time of the first frame 184, so an erasure was played instead of the first frame 184). In this example, the analyzer 122 may update the de-jitter buffer 126 to store the first copy of the second packet 134 in the first buffer entry 114. The analyzer 122 may update the buffer timeline 106 to indicate that the first frame 184 is the next frame to be processed in response to determining that the first copy of the second packet 134 is to be stored in the first buffer entry 114 and that an erasure corresponding to the first frame 184 has been played. In this example, processing the first buffer entry 114 after the erasure may add an additional delay to processing of subsequent frames because the erasure has already been played corresponding to the first frame 184, as further described with reference to FIGS. 2A-5 and 7. The additional delay may result in implicit buffer adaptation by causing a buffer depth of the de-jitter buffer 126 to implicitly increase (e.g., by 1 frame) to buffer a greater number of frames. In a particular implementation, the buffer depth may revert (e.g., reduce by 1 frame) after a subsequent period of silence in the input audio signal 130. For example, the analyzer 122 may process a subsequent frame after the period of silence in response to determining that a buffering period associated with the subsequent frame has expired (e.g., without the additional delay). The processed audio signal 116 may include a shorter silence than the input audio signal 130. As a result of the implicit buffer adaptation, the depth of the de-jitter buffer 126 may adjust dynamically to changing network conditions. For example, the depth of the de-jitter buffer may increase (e.g., by 1 frame) when network conditions (e.g., congestion or packet loss) cause a frame (e.g., partial data of the frame) to be received subsequent to processing of an erasure corresponding to the frame. As another example, the depth of the de-jitter buffer may revert (e.g., decrease by 1 frame) after a subsequent silence.

In a particular implementation, the analyzer 122 may receive the first packet 132 subsequent to receiving the second packet 134 and prior to processing the first buffer entry 114. The analyzer 122 may update the first buffer entry 114 in response to receiving the first packet 132 and determining that the first generation timestamp indicated by the first packet 132 exceeds the last generation timestamp 138. For example, the analyzer 122 may remove the first copy of the second packet 134 from the first buffer entry 114. In a particular implementation, the analyzer 122 may delete (or mark for deletion) the first copy of the second packet 134 corresponding to the first buffer entry 114 from the memory 176. The analyzer 122 may store the first packet 132 in the first buffer entry 114. In a particular implementation, the analyzer 122 may store the first packet 132 in a particular location in the memory 176 and may update the first buffer entry 114 to indicate (e.g., an address of) the particular location in the first buffer entry 114. The analyzer 122 may update the first flag 144 to a particular value (e.g., 0) to indicate that the first buffer entry 114 corresponds to a full copy of frame data of a frame. The analyzer 122 may update the first generation timestamp 148 to indicate the first generation timestamp of the first frame 184. The analyzer 122 may update the first receive timestamp 140 to indicate a receive timestamp of the first packet 132. The analyzer 122 (or the receiver 124) may determine the receive timestamp of the first packet 132 in response to receiving the first packet 132. The analyzer 122 may process the first buffer entry 114 and the second buffer entry 118. The speech decoder 160 may generate a processed speech signal based on the first frame data 164 and the second frame data 166.

The system 100 may enable implicit buffer adaptation by enabling frame data (e.g., a partial copy) of a frame to be buffered in a de-jitter buffer subsequent to playing an erasure corresponding to the frame. Processing the frame data subsequent to playing the erasure corresponding to the frame may delay processing of subsequent frames of a frame sequence, resulting in buffering of more frames by the de-jitter buffer. A depth of the de-jitter buffer may be implicitly increased by processing the frame data subsequent to playing the erasure. Interruptions of the processed audio signal that may be caused by enforcement of a playout delay may be avoided by generating a first receive timestamp corresponding to a buffer entry when the buffer entry stores partial data for a lost packet. The first receive timestamp may indicate a first time that is earlier than a second receive timestamp of a packet that included the partial data.

One particular advantage provided by the system 100 is enabling implicit buffer adaptation when frame data of a particular frame is received subsequent to playing an erasure corresponding to the particular frame. Implicit buffer adaptation increases the buffer depth, which allows the particular frame to be processed after playing an erasure corresponding to the particular frame, without a permanent increase in an end-to-end delay between the source device 104 and the destination device 102. Accordingly, implicit buffer adaptation improves quality of the processed audio signal 116 with only a temporary increase in the end-to-end delay.

Figure 2A:
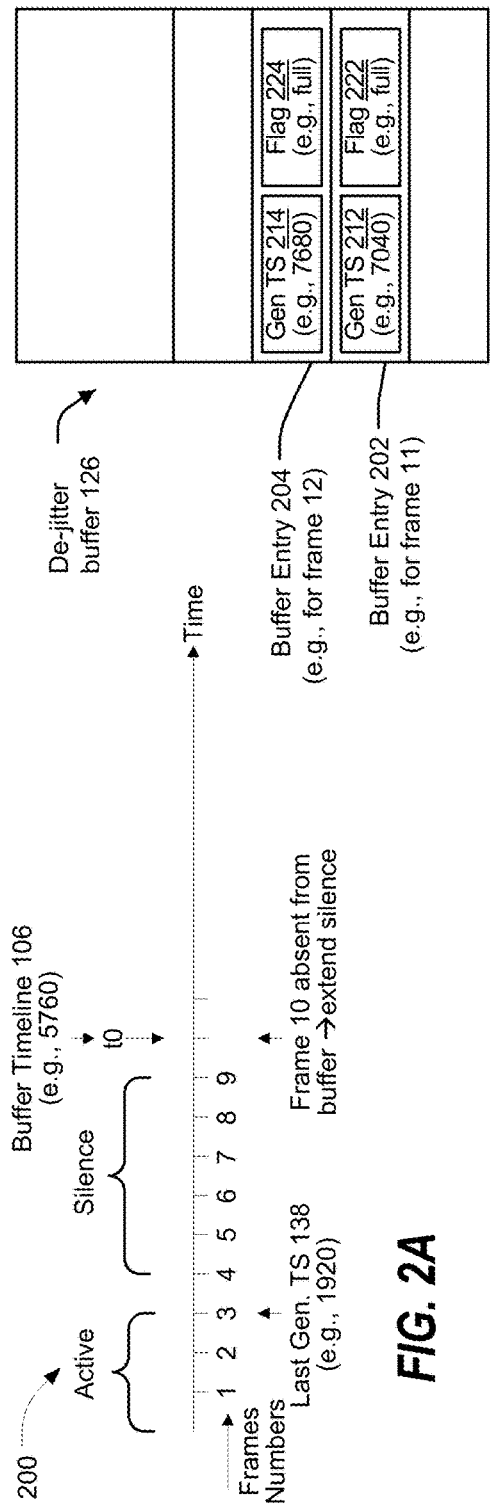
FIG. 2A is a diagram illustrating operation of a particular example of the system of FIG. 1.
Figure 2B:
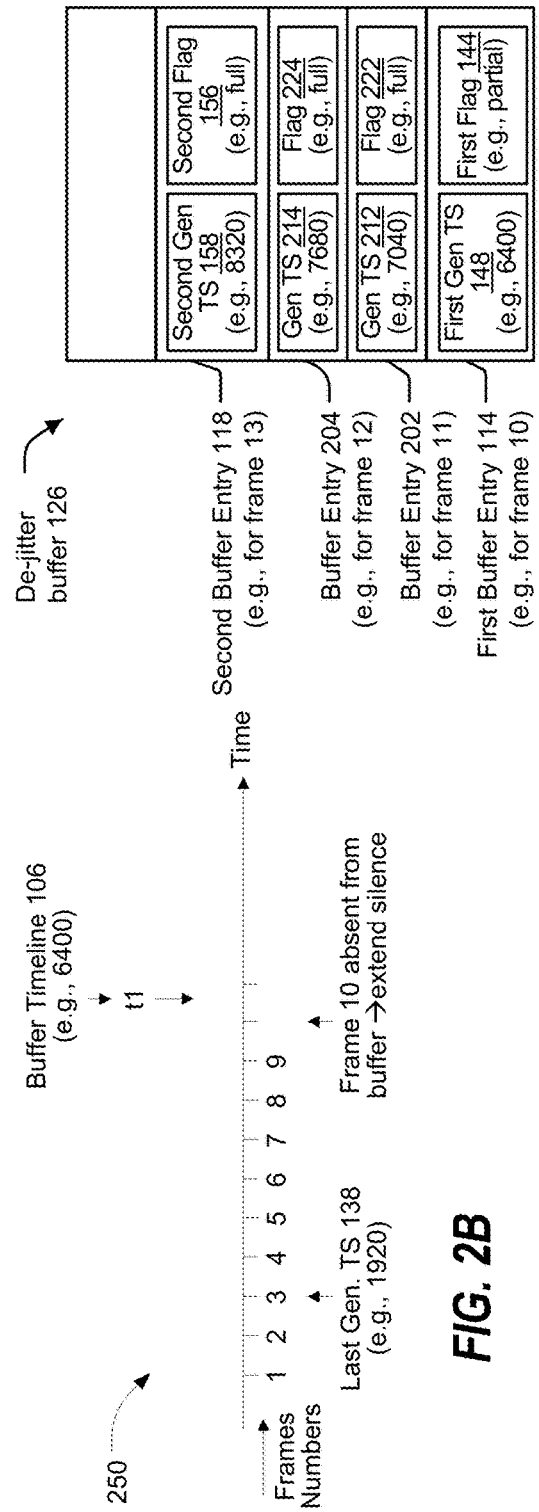
FIG. 2B is a diagram illustrating operation of a particular example of the system of FIG. 1.
Figure 3:
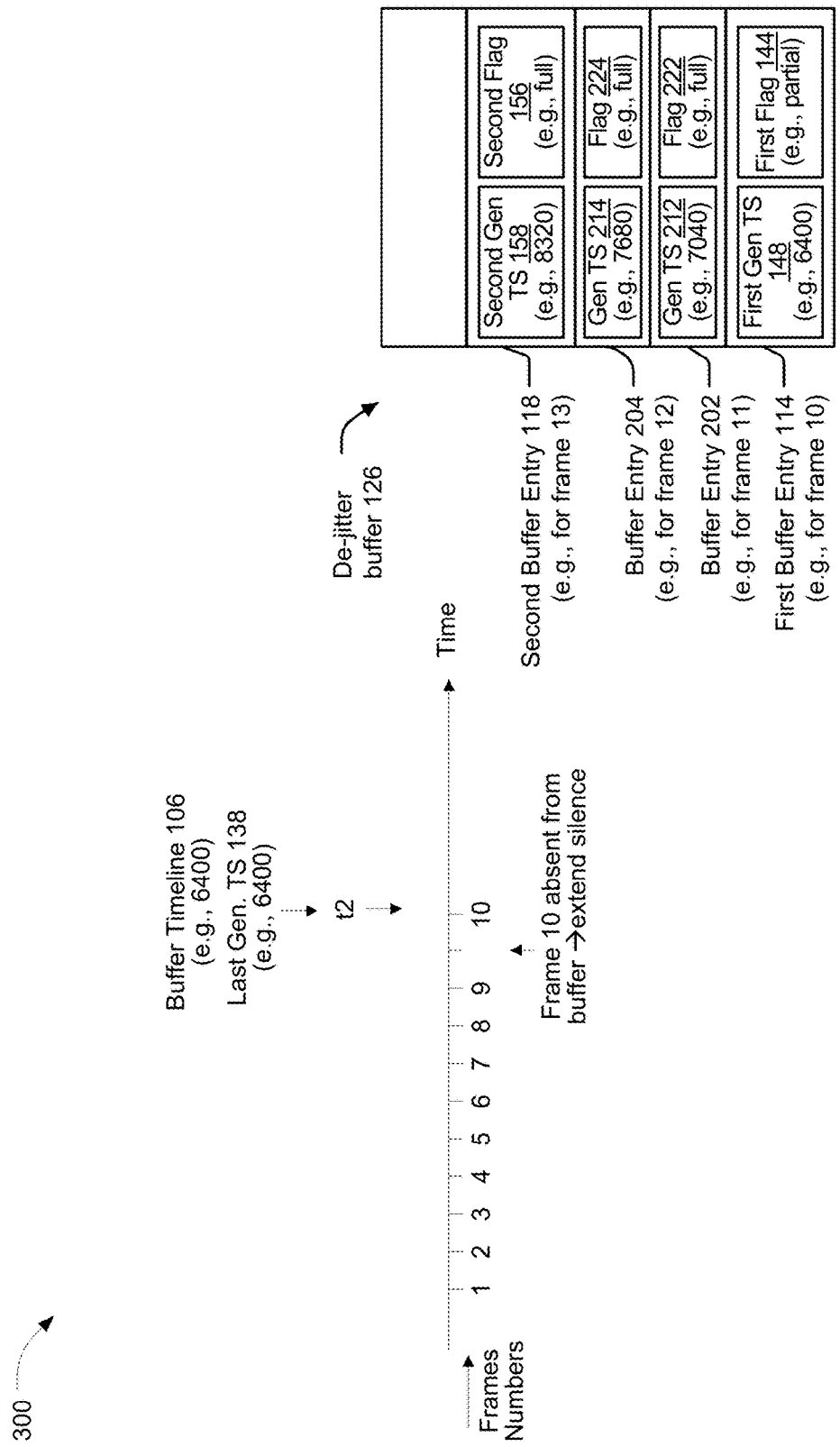
FIG. 3 is a diagram illustrating operation of a particular example of the system of FIG. 1.
Figure 5:
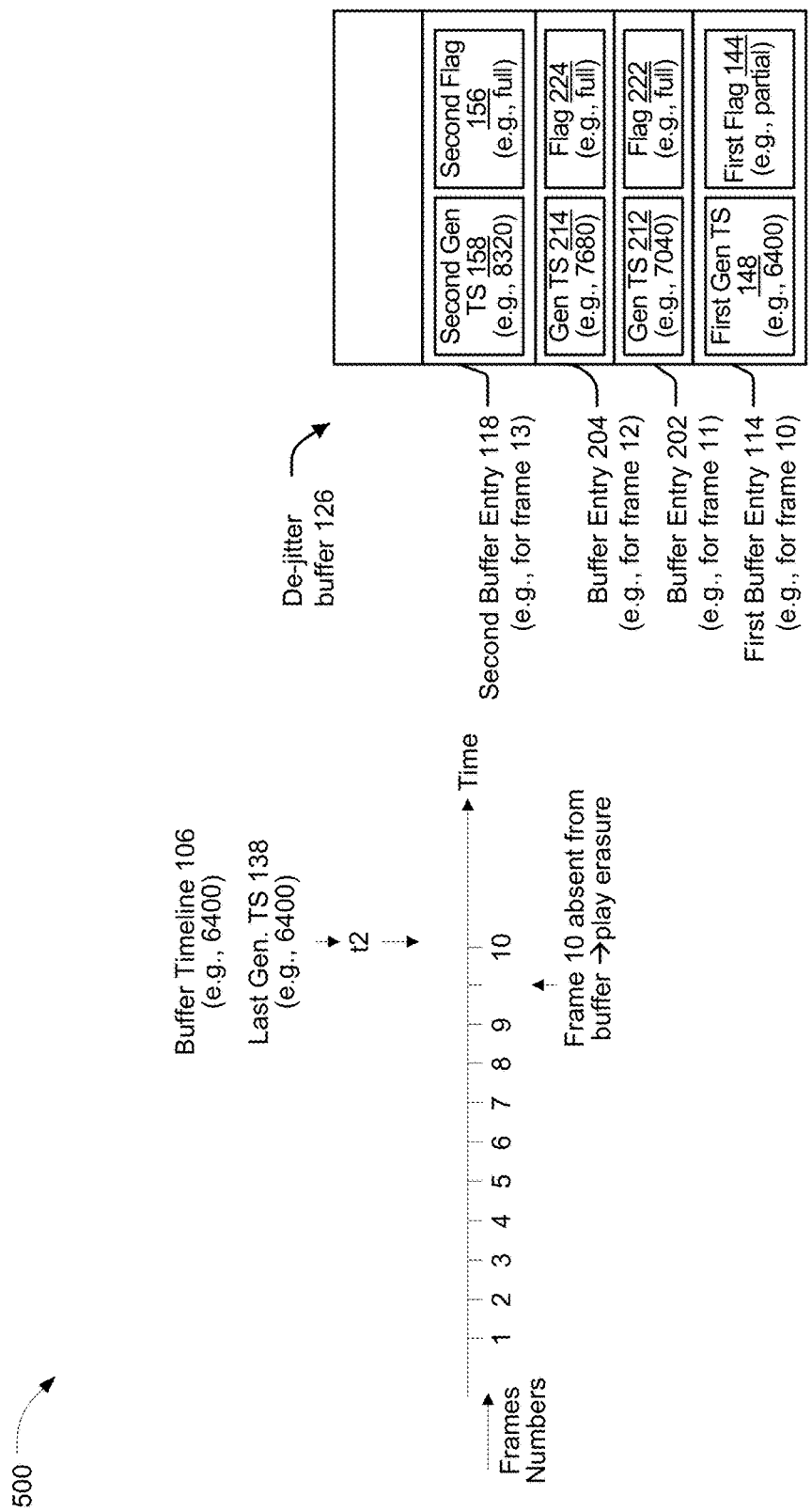
FIG. 5 is a diagram illustrating operation of a particular example of the system of FIG. 1.

FIGS. 2A-5 illustrate non-limiting examples of operation of system 100 of FIG. 1 when a partial copy of frame data of a frame is received subsequent to playing an erasure corresponding to the frame. FIGS. 2A-3 illustrate operation of the system 100 when the frame corresponds to an active frame including speech data subsequent to silence. For example, the active frame may correspond to a talk spurt following a period of silence. FIGS. 4A-5 illustrate operation of the system 100 when the frame corresponds to an active frame including speech data in a sequence of active frames of speech data.

Referring to FIG. 2A, a diagram illustrating operation of a particular example of the system of FIG. 1 is disclosed and generally designated 200. The diagram 200 illustrates frame numbers of processed frames as a function of time. The diagram 200 also illustrates a state of the de-jitter buffer 126 at a time t0. As illustrated in FIG. 2A, at the time t0, a subset of frames of a frame audio sequence may have been processed by the analyzer 122 of FIG. 1. For example, frames 1-3 may correspond to active speech (e.g., a talk spurt). The analyzer 122 may have processed the frames 1-3. The last generation timestamp 138 may indicate a generation timestamp (e.g., 3*640=1920) of a most recently processed frame (e.g., frame 3). Frames 4-9 may correspond to a period of silence between talk spurts. The analyzer 122 may play silence frames, no data frames, or erasures corresponding to frames 4-9. A value of the buffer timeline 106 at the time t0 may indicate a generation timestamp (e.g., 5760) corresponding to the frame 9. The de-jitter buffer 126 may include a buffer entry 202 corresponding to a frame 11 and a buffer entry 204 corresponding to a frame 12. The buffer entry 202 may include a generation timestamp 212 (e.g., 7040) of the frame 11. The buffer entry 204 may include a generation timestamp 214 (e.g., 7680) of the frame 12. The buffer entry 202 may include a flag 222 with a first value to indicate that the buffer entry 202 corresponds to a full copy of frame data of a frame. The buffer entry 204 may include a flag 224 with the first value to indicate that the buffer entry 204 corresponds to a full copy of frame data of a frame.

At the time t0, the analyzer 122 may determine that a next frame to be processed is a frame 10 based on the buffer timeline 106 (e.g., 5760). For example, the analyzer 122 may determine a next generation timestamp (e.g., 6400) of the next frame (e.g., the first frame 184 of FIG. 1) based on the value of the buffer timeline 106 (e.g., next generation timestamp=buffer timeline 106+number of samples per frame (e.g., 640)). The analyzer 122 may determine that the next frame (e.g., frame 10) is absent from the de-jitter buffer 126. For example, the analyzer 122 may determine that a buffer entry corresponding to the next generation timestamp is missing from the de-jitter buffer 126. The analyzer 122 may extend the period of silence by one frame length (e.g., by playing a silence frame or a no data frame) in response to determining that the frame 10 (e.g., the first frame 184) is absent from the de-jitter buffer 126. The analyzer 122 may update the value of the buffer timeline 106 to indicate a generation timestamp corresponding to frame 10. For example, the analyzer 122 may increment the value of the buffer timeline 106 by the number of samples per frame (e.g., 640) upon extending the period of silence for the frame 10 being absent from the de-jitter buffer 126.

Referring to FIG. 2B, a diagram that continues the example of FIG. 2A is disclosed and generally designated 250. At time t1, subsequent to extending the period of silence corresponding to the frame 10, the analyzer 122 may receive a packet (e.g., the second packet 134 of FIG. 1) including frame data (e.g., a partial copy of frame data) of the frame 10. The packet may also include a full copy of frame data of another frame (e.g., the frame 13). The second packet 134 may indicate a generation timestamp (e.g., 8320) of the frame 13. The analyzer 122 may store a copy of the packet (e.g., the second packet 134) in the second buffer entry 118 corresponding to the frame 13 (e.g., the second frame 186). The analyzer 122 may store the second generation timestamp 158 in the second buffer entry 118. The second generation timestamp 158 may indicate the generation timestamp (e.g., 8320) of the frame 13. The analyzer 122 may set the second flag 156 to a particular value (e.g., 1) indicating that the second buffer entry 118 corresponds to a full copy of frame data of a frame.

The analyzer 122 may determine the first generation timestamp 148 for the frame 10 (e.g., 6400) based on the second generation timestamp 158 and the frame offset 136 of FIG. 1, as described with reference to FIG. 1. The analyzer 122 may store a first copy of the packet (e.g., the second packet 134) in the first buffer entry 114 corresponding to the frame 10 (e.g., the first frame 184) in response to determining that the first generation timestamp 148 exceeds the last generation timestamp 138 (e.g., 1920). The analyzer 122 may store the first copy of the packet (e.g., the second packet 134) in the first buffer entry 114 independently of the value of the buffer timeline 106. For example, the analyzer 122 may store the first copy of the packet (e.g., the second packet 134) in the first buffer entry 114 regardless of a value (e.g., 6400) of the buffer timeline 106 indicating the period of silence has been extended by one frame length. In a particular implementation, the analyzer 122 may update the buffer timeline 106 to indicate that the first frame 184 (e.g., the frame 10) is the next frame to be processed in response to determining that the value of the buffer timeline 106 is greater than or equal to the first generation timestamp 148. For example, the analyzer 122 may update the buffer timeline 106 to indicate a generation timestamp (e.g., 5760) in response to determining that the value of the buffer timeline 106 is greater than or equal to the first generation timestamp 148. The generation timestamp (e.g., 5760) may be prior to the first generation timestamp 148 (e.g., 6400). Updating the buffer timeline 106 to indicate that the first frame 184 (e.g., the frame 10) is a next frame to be processed may enable the analyzer 122 to process the first buffer entry 114 subsequent to extending the period of silence by one frame length.

Referring to FIG. 3, a diagram that continues the example of FIGS. 2A and 2B is disclosed and generally designated 300. The analyzer 122 may determine that a next frame to be processed is the first frame 184 (e.g., the frame 10). For example, the analyzer 122 may determine a next generation timestamp (e.g., 6400) based on a value of the buffer timeline 106 (e.g., 5760) and a number of samples per frame (e.g., 640). The analyzer 122 may determine that the de-jitter buffer 126 includes the first buffer entry 114 corresponding to the next generation timestamp (e.g., 6400) based on the first generation timestamp 148. The analyzer 122 may, at time t2, process the first buffer entry 114. For example, the analyzer 122 may provide the frame data (e.g., the first partial data 174), the packet (e.g., the second packet 134), first speech parameters corresponding to the first frame 184 (e.g., the frame 10), or a combination thereof, to the speech decoder 160, as described with reference to FIG. 1. The analyzer 122 may update the buffer timeline 106 to indicate the first generation timestamp 148 in response to processing the first frame 184 (e.g., the frame 10). For example, the analyzer 122 may increment the buffer timeline 106 by the number of samples per frame (e.g., 640).

The speech decoder 160 may generate the processed audio signal 116, as described with reference to FIG. 1. Processing the first buffer entry 114 subsequent to extending the period of silence by one frame length may cause the buffer entry 202, the buffer entry 204, and the second buffer entry 118 to be stored in the de-jitter buffer 126 for an additional time corresponding to a playout duration of the first frame 184. For example, the first buffer entry 114 may be processed at a time when the buffer entry 202 would have been processed if the first buffer entry 114 had not been inserted into the de-jitter buffer 126. Processing of the buffer entry 202 may be delayed by the playout duration (e.g., 20 milliseconds) of the first frame 184 (e.g., the frame 10), resulting in a processing delay of subsequent frames. During the processing delay, the destination device 102 may receive additional packets and the de-jitter buffer 126 may buffer frames corresponding to the additional packets. A number of frames buffered by the de-jitter buffer 126 may increase, resulting in an implicit buffer adaptation by implicitly increasing a depth of the de-jitter buffer 126. The processing delay may increase a likelihood that the de-jitter buffer 126 includes data corresponding to subsequent frames at a time when the subsequent frames are to be processed.

Referring to FIG. 4A, a diagram illustrating operation of another particular implementation of the system of FIG. 1 is disclosed and generally designated 400. The diagram 400 differs from the diagram 300 of FIG. 3 in that the frames 1-9 correspond to active speech (e.g., a talk spurt). The last generation timestamp 138 may indicate a generation timestamp (e.g., 5760) of a most recently processed frame (e.g., the frame 9). The last generation timestamp 138 may indicate the same value as the buffer timeline 106. The analyzer 122 may, at time t0, play an erasure in response to determining that the frame 10 is absent from the de-jitter buffer 126, such as described with reference to FIGS. 1 and 2A.

Referring to FIG. 4B, a diagram that continues the example of FIG. 4A is disclosed and generally designated 402. The analyzer 122 may, at time t1, store the first copy of the packet (e.g., the second packet 134) in the first buffer entry 114 in response to determining that the first generation timestamp 148 exceeds the last generation timestamp 138, as described with reference to FIGS. 1 and 2B. The analyzer 122 may store the first copy of the packet (e.g., the second packet 134) in the first buffer entry 114 independently of whether the value of the buffer timeline 106 indicates that the erasure corresponding to the first frame 184 (e.g., the frame 10) has been played. In a particular implementation, the analyzer 122 may update the buffer timeline 106 to indicate that the first frame 184 is the next frame to be processed in response to determining that the value of the buffer timeline 106 indicates that a frame subsequent to the first frame 184 in the sequence of audio frames is the next frame to be processed. For example, the analyzer 122 may update the buffer timeline 106 to indicate a generation timestamp (e.g., 5760) that is prior to the first generation timestamp 148 (e.g., 6400) in response to determining that the value (e.g., 6400) of the buffer timeline 106 is greater than or equal to the first generation timestamp 148.

Referring to FIG. 5, a diagram that continues the example of FIGS. 4A and 4B is disclosed and generally designated 500. The analyzer 122 may, at time t2, process the first buffer entry 114. Processing the first buffer entry 114 subsequent to playing the erasure corresponding to the first frame 184 (e.g., the frame 10) may enable implicit buffer adaptation, as described with reference to FIGS. 1 and 3.

Figure 6:
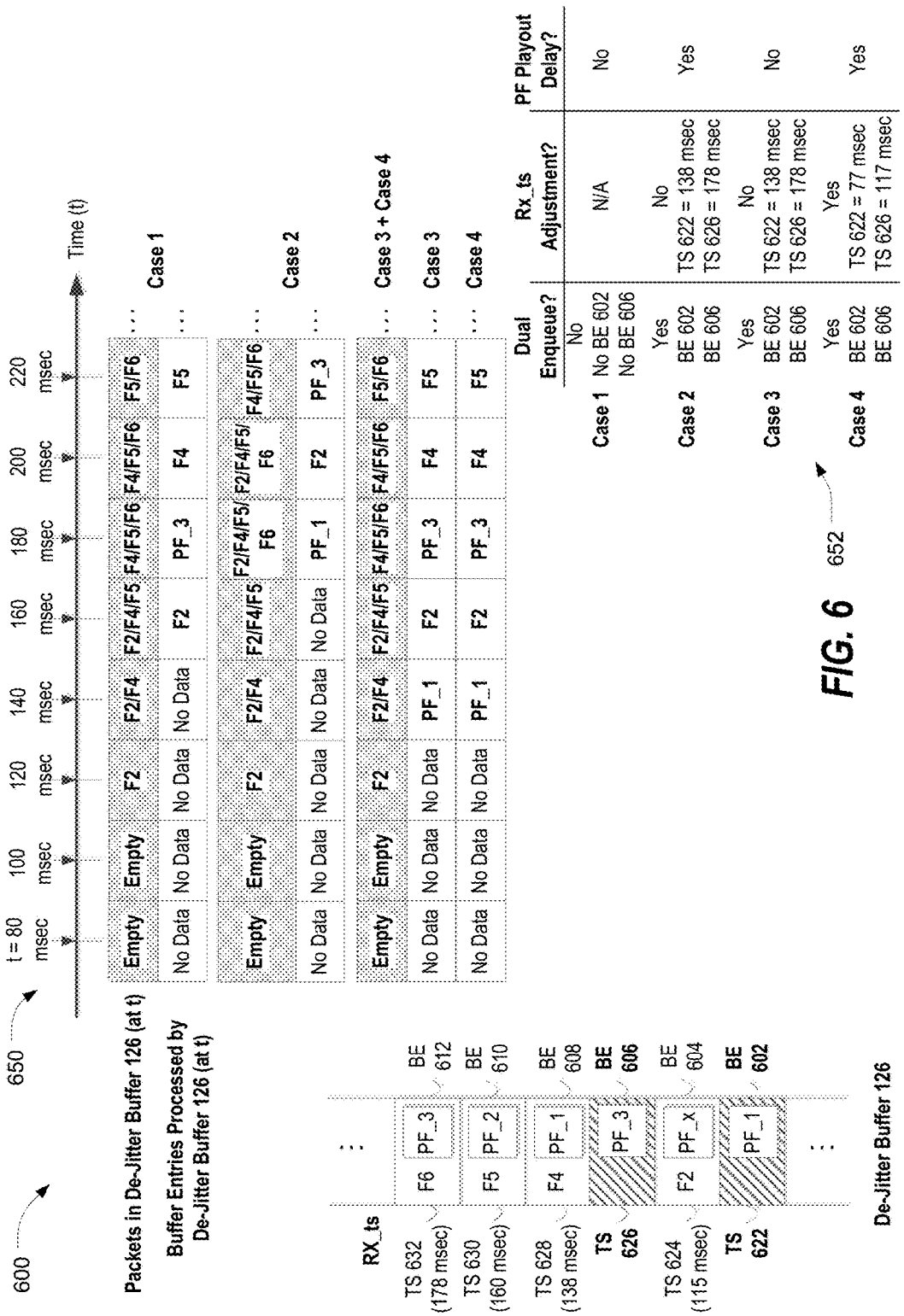
FIG. 6 is a diagram illustrating operation of particular implementations of the system of FIG. 1.

Referring to FIG. 6, a diagram illustrating operation of particular implementations of the system of FIG. 1 is disclosed and generally designated 600. The diagram 600 illustrates a comparison of when buffer entries are processed in various implementations. The diagram 600 includes a table 652 that illustrates a comparison of 4 cases. The diagram 600 includes a table 650 that illustrates which packets are present in the de-jitter buffer 126 (shown in FIG. 6 using a shading pattern) and when buffer entries are processed in each of the 4 cases. The diagram 600 also illustrates buffer entries of the de-jitter buffer 126.

As shown in the table 652, case 1 corresponds to an implementation in which a packet including partial data corresponding to a particular frame and full frame data corresponding to another frame is enqueued once (e.g., no dual-enqueuing) in the de-jitter buffer 126. In case 1, partial data is processed independently of a playout delay (e.g., a minimum playout delay). Full frame data may be processed based on the playout delay (e.g., 40 milliseconds (ms)) in cases 1-4. As shown in the table 652, receive timestamp adjustment (Rx_ts adjustment) is not applicable in case 1.

As shown in the table 652, cases 2-4 correspond to an implementation in which a packet including partial data corresponding to a particular frame and full frame data corresponding to another frame is enqueued twice (e.g., dual-enqueuing). For example, a first copy of the packet may be enqueued in a first buffer entry corresponding to the particular frame, and a second copy of the packet may be enqueued in a second buffer entry corresponding to the other frame.

As shown in the table 652, there is no receive timestamp adjustment (Rx_ts adjustment) in cases 2-3. For example, the first buffer entry may store a receive timestamp of the packet. The second buffer entry may also store the receive timestamp of the packet. In case 2, partial data is processed based on a playout delay (e.g., a minimum playout delay), and in case 3, partial data is processed independently of the playout delay.

As shown in the table 652, there is receive timestamp adjustment (Rx_ts adjustment) in case 4. For example, a first receive timestamp may be generated that indicates a first time that is earlier than a second time indicated by a receive timestamp of the packet. The first buffer entry may store the first receive timestamp. In case 4, partial data is processed based on a playout delay (e.g., a minimum playout delay).

As shown in the table 650, at time t=80 milliseconds (ms) and at time t=100 ms, the de-jitter buffer 126 is empty (e.g., does not include data corresponding to a sequence of frames). The analyzer 122 may provide an indication of no data to the speech decoder 160.

At time t=120 ms, the de-jitter buffer 126 may include a buffer entry 604 corresponding to a second frame (F2) of the sequence of frames. The buffer entry 604 may store a timestamp (TS) 624 corresponding to a receive timestamp (e.g., 115 ms) of a packet that includes full frame data of the second frame (F2). The analyzer 122 may determine a buffering period corresponding to the buffer entry 604 based on the TS 624 (e.g., 115 ms) and the playout delay (e.g., 40 ms). For example, the analyze 122 may determine that the buffering period corresponding to the buffer entry 604 expires at a time (e.g., 155 ms) corresponding to a sum of a first time (e.g., 115 ms) indicated by the TS 624 and the playout delay (e.g., 40 ms). At the time t=120 ms, in cases 1-4, the analyzer 122 may refrain from processing (and dequeuing) the buffer entry 604 in response to determining that the buffering period corresponding to the buffer entry 604 is unexpired. The analyzer 122 may provide an indication of no data to the speech decoder 160.

At time t=140 ms, the de-jitter buffer 126 may include the buffer entry 604 corresponding to the second frame (F2), and a buffer entry 608 corresponding to a fourth frame (F4) of the sequence of frames. The buffer entry 608 may store a TS 628 corresponding to a receive timestamp (e.g., 138 ms) of a packet that includes full frame data of the fourth frame (F4). The packet may also include partial data of a first frame (F1) of the sequence of frames.

At the time t=140 ms, in cases 1-4, the analyzer 122 may determine that buffering periods corresponding to the buffer entries 604 and 608 are unexpired. For example, a first buffering period corresponding to the buffer entry 604 may expire at a time t=155 ms, and a second buffering period corresponding to the buffer entry 608 may expire at a time t=178 ms (138 ms+40 ms). The analyzer 122 may refrain from processing the buffer entries 604 and 608 in response to determining that buffering periods corresponding to the buffer entries 604 and 608 are unexpired.

In case 1, the packet including the full frame data of the fourth frame (F4) and the partial data of the first frame (F1) may be enqueued once in the de-jitter buffer 126. For example, the de-jitter buffer 126 may include the buffer entry 608 corresponding to the fourth frame (F4) and may exclude a buffer entry corresponding to the first frame (F1). In case 1, partial data is processed independently of the playout delay. The analyzer 122 may be unable to determine that the particular frame (e.g., F1) is a next frame to be processed when the analyzer 122 has not processed frames prior to a particular frame (e.g., F1) in a sequence of frames and the de-jitter buffer 126 does not include a buffer entry corresponding to the particular frame (e.g., F1). Since the particular frame (e.g., F1) is not indicated as the next frame to be processed, the analyzer 122 may be unable to determine that the full frame data corresponding to the particular frame (e.g., F1) is lost and may not look for partial data corresponding to the particular frame (e.g., F1) in buffer entries corresponding to other frames (e.g., F4). Thus, the analyzer 122 may provide an indication of no data to the speech decoder 160. In case 1, even though the de-jitter buffer 126 includes the partial data corresponding to the first frame (F1), the analyzer 122 may play an erasure (e.g., provide an indication of no data) because there is no dual-enqueuing and no buffer entry corresponding to the first frame (F1).

In cases 2-4, the packet including the full frame data of the fourth frame (F4) and the partial data of the first frame (F1) may be dual-enqueued in the de-jitter buffer 126. For example, the de-jitter buffer 126 may include a buffer entry 602 corresponding to the first frame (F1) and the buffer entry 608 corresponding to the fourth frame (F4). The buffer entry 602 may store a TS 622. In cases 2-3, without receive timestamp adjustment, the TS 622 may correspond to the TS 628 (e.g., 138 ms) of the buffer entry 608 (e.g., the receive timestamp of the packet).

In case 2, partial data is processed based on a playout delay (e.g., 40 ms). The analyzer 122 may determine that a buffering period associated with the buffer entry 602 expires at a time t=178 ms based on the TS 622 (e.g., 138 ms) and the playout delay (e.g., 40 ms). Thus, the analyzer 122 of FIG. 1 may refrain from processing the buffer entry 602 at the time t=140 ms in response to determining that the buffering period associated with the buffer entry 602 is unexpired. The analyzer 122 may provide an indication of no data to the speech decoder 160. In case 2, even though the de-jitter buffer 126 includes the partial data corresponding to the first frame (F1), the analyzer 122 may play an erasure (e.g., provide an indication of no data) because partial data is processed based on a playout delay and there is no receive timestamp adjustment.

In case 3, partial data is processed independently of a playout delay (e.g., 40 ms). A buffering period associated with the buffer entry 602 would have expired at a time t=178 ms based on the TS 622 (e.g., 138 ms) and the playout delay (e.g., 40 ms). If the analyzer 122 of FIG. 1 were to process the buffer entry 602 based on the buffering period, the analyzer 122 would refrain from processing the buffer entry 602 at the time t=140 ms because the buffering period would be unexpired. However, in case 3, the analyzer 122 may process the buffer entry 602 at the time t=140 ms independently of the buffering period because the buffer entry 602 stores partial data.

In case 4, with receive timestamp adjustment, the TS 622 may indicate a first time (e.g., 77 ms) that is earlier than a second time (e.g., 138 ms) indicated by the TS 628. For example, the analyzer 122 may generate the TS 622 based on the TS 628, the frame offset 136 (e.g., 3 frames) of FIG. 1, and a playout duration (e.g., 20 ms), as described with reference to FIG. 1. In case 4, partial data is processed based on a playout delay (e.g., 40 ms). The analyzer 122 may determine that a buffering period associated with the buffer entry 602 expired at a time t=117 ms based on the TS 622 (e.g., 77 ms) and the playout delay (e.g., 40 ms). The analyzer 122 of FIG. 1 may process the buffer entry 602 at the time t=140 ms in response to determining that the buffering period associated with the buffer entry 602 has expired.

In cases 3-4, the analyzer 122 may provide data corresponding to the buffer entry 602 to the speech decoder 160 subsequent to processing the buffer entry 602 at the time t=140 ms. The speech decoder 160 may generate the processed audio signal 116 of FIG. 1 based on the data corresponding to the buffer entry 602, as described with reference to FIG. 1.

At a time t=160 ms, the de-jitter buffer 126 may include a buffer entry 610 corresponding to the fifth frame (F5). The buffer entry 610 may include a TS 630 indicating a receive timestamp (e.g., 160 ms) of a packet that includes full frame data of the fifth frame (F5). The packet may include partial data of the second frame (F2). The analyzer 122 may refrain from dual-enqueuing the packet in the de-jitter buffer 126. For example, in case 1, there is no dual-enqueuing. In cases 2-4, the analyzer 122 may refrain from dual-enqueuing the packet in response to determining that the de-jitter buffer 126 already includes a buffer entry (e.g., the buffer entry 604) corresponding to the second frame (F2) and that the packet includes partial data corresponding to the second frame (F2). For example, the analyzer 122 may store the packet in the buffer entry 610 corresponding to the fifth frame (F5) but may refrain from storing a copy of the packet in a buffer entry corresponding to the second frame (F2).

At the time t=160 ms, in cases 1 and 3-4, the de-jitter buffer 126 does not include the buffer entry 602. For example, in case 1, the analyzer 122 may not have added the buffer entry 602 to the de-jitter buffer 126 because of single-enqueuing, as described herein. In cases 3-4, the analyzer 122 may have dequeued (e.g., removed) the buffer entry 602 from the de-jitter buffer 126 in response to processing the buffer entry 602. In cases 1 and 3-4, the analyzer 122 may process the buffer entry 604 corresponding to the second frame (F2) in response to determining that a buffering period corresponding to the buffer entry 604 has expired.

In case 2, the de-jitter buffer 126 may include the buffer entry 602 because of dual-enqueuing and because the analyzer 122 refrained from processing the buffer entry 602 earlier (e.g., at the time t=140 ms), as described herein. Additionally, the analyzer 122 may determine that a buffering period corresponding to the buffer entry 602 has not expired at the time t=160 ms. For example, in case 2, the buffering period corresponding to the buffer entry 602 may expire at a time t=178 ms (e.g., 138 ms+40 ms). However, the analyzer 122 may determine that a buffering period associated with the buffer entry 604 has expired at the time t=160 ms. For example, the buffering period corresponding to the buffer entry 604 may expire at a time t=155 ms (e.g., 115 ms+40 ms). The analyzer 122 may refrain from processing the buffer entry 602 corresponding to the first frame (F1) in response to determining that the buffering period corresponding to the buffer entry 602 is unexpired. The analyze 122 may refrain from processing the buffer entry 604 in response to determining that the de-jitter buffer 126 includes the buffer entry 602 that corresponds to a frame (e.g., the first frame (F1)) that is earlier in the sequence of frames than the second frame (F2) associated with the buffer entry 604. The analyzer 122 may determine that the first frame (F1) is earlier than the second frame (F2) in the sequence of frames based on respective generation timestamps, as described with reference to FIG. 1. Thus, the analyzer 122 may play an erasure. For example, the analyzer 122 may send a notification of no data to the speech decoder 160.

At a time t=180 ms, the de-jitter buffer 126 may include a buffer entry 612 corresponding to the sixth frame (F6). The buffer entry 612 may include a TS 632 indicating a receive timestamp (e.g., 178 ms) of a packet that includes full frame data of the sixth frame (F6). The packet may also include partial data of the third frame (F3). In case 1, there is single-enqueuing (i.e., no dual-enqueuing); therefore the de-jitter buffer 126 may exclude a buffer entry 606 corresponding to the third frame (F3). In cases 2-4, the analyzer 122 may dual-enqueue the packet in the de-jitter buffer 126 in response to determining that the third frame (F3) is absent from the de-jitter buffer 126. For example, the analyzer 122 may store a first copy of the packet in the buffer entry 606 corresponding to the third frame (F3) and may store a second copy of the packet in the buffer entry 612 corresponding to the sixth frame (F6). The buffer entry 606 may include a TS 626. In cases 2-3, without receive timestamp adjustment, the TS 626 may be the same as the TS 632. For example, the TS 626 may indicate a receive timestamp (e.g., 178 ms) of the packet. In case 4, with receive timestamp adjustment, the TS 626 may indicate a first time (e.g., 117 ms) that is earlier than a second time (e.g., 178 ms) indicated by the TS 632. For example, the first time may be earlier than a time (e.g., 178 ms) indicated by the receive timestamp of the packet.

At the time t=180 ms, in case 1, the analyzer 122 may determine that the next frame to be processed is the third frame (F3) based on the buffer timeline 106 of FIG. 1, as described with reference to FIG. 1. For example, the analyzer 122 may update the buffer timeline 106 to indicate a generation timestamp of the second frame (F2). The analyzer 122 may determine that the next frame to be processed is the third frame (F3) having a particular generation timestamp that is next after the generation timestamp indicated by the buffer timeline 106. The analyzer 122 may determine that the full frame data corresponding to the third frame (F3) is lost in response to determining the third frame (F3) is the next frame to be processed and that the de-jitter buffer 126 does not include a buffer entry corresponding to the third frame (F3). The analyzer 122 may determine whether another buffer entry includes partial data corresponding to the third frame (F3) in response to determining that the full frame data corresponding to the third frame (F3) is lost. For example, the analyzer 122 may determine that the buffer entry 612 corresponding to the sixth frame (F6) includes partial data corresponding to the third frame (F3). The analyzer 122 may process, at the time t=180 ms, the partial data corresponding to the third frame (F3) independently of a playout delay.

In case 2, at the time t=180 ms, the analyzer 122 may process the buffer entry 602 corresponding to the first frame (F1) in response to determining that a playout delay period corresponding to the buffer entry 602 has expired.

In cases 3-4, at the time t=180 ms, the analyzer 122 may process the buffer entry 606 corresponding to the third frame (F3). For example, in case 3, the analyzer 122 may process the buffer entry 606 in response to determining that the third frame (F3) is a next frame to be processed independently of the playout delay. In case 4, the analyzer 122 may process the buffer entry 606 in response to determining that the third frame (F3) is the next frame to be processed and that a playout delay period corresponding to the buffer entry 606 has expired. For example, the playout delay period corresponding the buffer entry 606 may expire at a time t=157 ms (117 ms+40 ms).

At a time t=200 ms, in cases 1 and 3-4, the analyzer 122 may process the buffer entry 608 corresponding to the fourth frame (F4) in response to determining that the fourth frame (F4) is a next frame to be processed and that a playout delay period corresponding to the fourth frame (F4) has expired. In case 2, the analyzer 122 may process the buffer entry 604 corresponding to the second frame (F2) in response to determining that the second frame (F2) is a next frame to be processed, as described with reference to FIG. 1, and that a playout delay period corresponding to the buffer entry 604 has expired.

At a time t=220 ms, in cases 1 and 3-4, the analyzer 122 may process the buffer entry 610 corresponding to the fifth frame (F5) in response to determining that the fifth frame (F5) is a next frame to be processed and that a playout delay period corresponding to the fifth frame (F5) has expired. In case 2, the analyzer 122 may process the buffer entry 606 corresponding to the third frame (F2) in response to determining that the third frame (F3) is a next frame to be processed, as described with reference to FIG. 1, and that a playout delay period corresponding to the buffer entry 606 has expired.

The diagram 600 illustrates that single-enqueuing (as in case 1) may result in generation of a processed audio signal without frame data corresponding to initial frames of a sequence of frames when partial data of the initial frames is buffered in the de-jitter buffer 126 but the analyzer 122 has not determined that full frame data of the initial frames is lost, as described with reference to case 1 at the time t=140 ms.

The diagram 600 illustrates that, with dual-enqueuing and without receive time adjustment, processing partial data based on a playout delay may result in unnecessary erasures and delays in processing frames when partial data of a particular frame is buffered in the de-jitter buffer 126 but a buffering period associated with a buffer entry corresponding to the partial data has not expired, as described with reference to case 2 at the time t=140 ms and the time t=160 ms.

The diagram 600 illustrates that, in the example of FIG. 6, processing partial data independently of a playout delay with dual-enqueuing and without receive time adjustment may, in some situations, have a comparable performance as processing the partial data based on the playout delay with dual-enqueuing and with receive time adjustment, as described with reference to cases 3-4. Processing partial data independently of a playout delay with dual-enqueuing and without receive time adjustment may have distinct results compared to processing the partial data based on the playout delay with dual-enqueuing and with receive time adjustment in other situations (e.g., high jittercases), e.g., as described with reference to FIG. 8.

Figure 7:
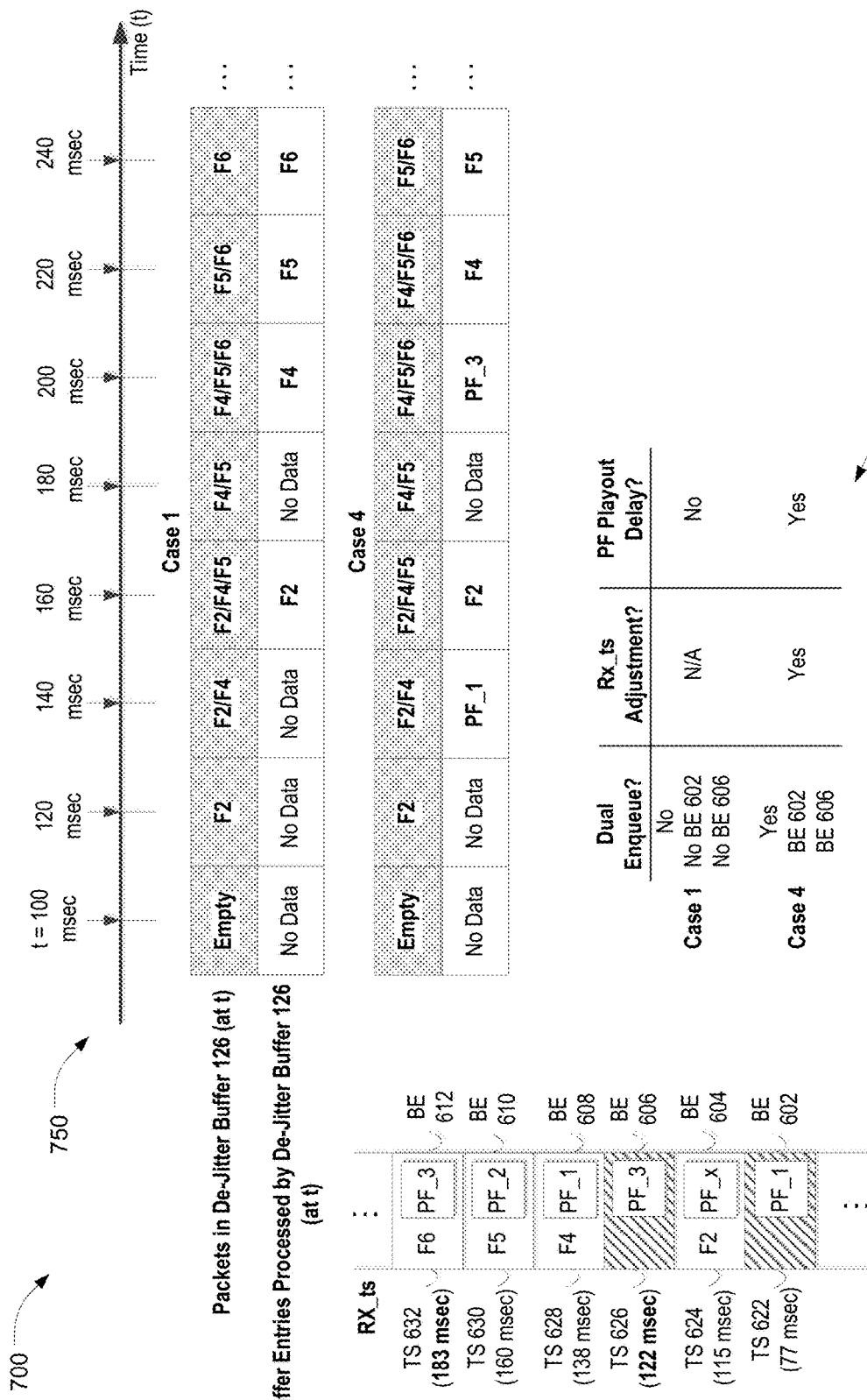
FIG. 7 is a diagram illustrating operation of particular implementations of the system of FIG. 1.

Referring to FIG. 7, a diagram illustrating operation of particular implementations of the system of FIG. 1 is shown and generally designated 700. The diagram 700 illustrates a comparison of when buffer entries are processed in various implementations. The diagram 700 includes a table 752 that illustrates a comparison of 2 cases. The diagram 700 includes a table 750 that illustrates which packets are present in the de-jitter buffer 126 (shown in FIG. 7 using a shading pattern) and when buffer entries are processed in each of the 2 cases (cases 1 and 4 of FIG. 6). The diagram 700 illustrates buffer entries of the de-jitter buffer 126.

Buffer entries of the de-jitter buffer 126 of FIG. 7 differ from buffer entries of the de-jitter buffer 126 of FIG. 6 in that the TS 632 of the buffer entry 612 corresponding to the sixth frame (F6) indicates a first time (e.g., 183 ms) in FIG. 7 that is later than a time (e.g., 178 ms) indicated by the TS 632 in FIG. 6. For example, a packet including full frame data of the sixth frame (F6) may be associated with a first receive timestamp, in the example described with reference to FIG. 7, that is later than a receive timestamp of the packet in the example described with reference to FIG. 6. The packet may include partial data corresponding to the third frame (F3).

In case 4, the analyzer 122 may generate the TS 626 (e.g., 122 ms) corresponding to the third frame (F3) based on the TS 632 (e.g., 183 ms), the frame offset 136 of FIG. 1, and a playout duration (e.g., 20 ms), as described with reference to FIG. 1. The TS 626 of FIG. 7 may indicate a first time (e.g., 122 ms) that is later than a second time indicated by the TS 626 (e.g., 117 ms) of FIG. 6.

At time t=100 ms to time t=160 ms, the analyzer 122 may operate as described with reference to FIG. 6. At a time t=180 ms, the analyzer 122 may determine that a buffer entry corresponding to the third frame (F3) is absent from the de-jitter buffer 126. The analyzer 122 may play an erasure (e.g., provide a notification indicating no data to the speech decoder 160 of FIG. 1). In a particular example, the speech decoder 160 may request the analyzer 122 to determine if the de-jitter buffer 126 has a buffer entry storing partial data corresponding to the third frame (F3) in response to receiving the notification indicating no data. The analyzer 122 may provide another notification indicating no data to the speech decoder 160 in response to determining that none of the buffer entries of the de-jitter buffer 126 include partial data corresponding to the third frame (F3).

At a time t=200 ms, the de-jitter buffer 126 may include the buffer entry 612 corresponding to the sixth frame (F6). The buffer entry 612 may include partial data corresponding to the third frame (F3). In case 4, the de-jitter buffer 126 may include the buffer entry 606 corresponding to the third frame (F3). For example, the analyzer 122 may include the buffer entry 606 in the de-jitter buffer 126 subsequent to playing the erasure corresponding to the third frame (F3) in response to determining that a most recently processed frame is prior to the third frame (F3) in the sequence of frames, as described with reference to FIG. 1. The analyzer 122 may update the buffer timeline 106 to indicate that the third frame (F3) is a next frame to be processed, as described with reference to FIG. 1.

At the time t=200 ms, in case 1, the analyzer 122 may determine that the de-jitter buffer 126 does not include a buffer entry corresponding to the third frame (F3). The analyzer 122 may refrain from determining whether a buffer entry corresponding to another frame includes partial data corresponding to the third frame (F3) in response to determining that an erasure corresponding to the third frame (F3) has been played. The analyzer 122 may process the buffer entry 608 corresponding to the fourth frame (F4) in response to determining that the fourth frame (F4) is a next frame to be processed, that the de-jitter buffer 126 does not include a buffer entry corresponding to the third frame (F3), and that a buffering period corresponding to the buffer entry 608 has expired.

At the time t=200 ms, in case 4, the analyzer 122 may process the buffer entry 606 corresponding to the third frame (F3) in response to determining that the third frame (F3) is the next frame to be processed and that a buffering period corresponding to the buffer entry 606 has expired. Processing the buffer entry 606 corresponding to the third frame (F3) subsequent to playing an erasure corresponding to the third frame may cause implicit buffer adaptation, as described with reference to FIG. 1.

Processing of subsequent frames (e.g., F4, F5, F6, etc.) may be delayed in case 4 as compared to case 1, increasing a likelihood that data corresponding to the subsequent frames is in the de-jitter buffer 126 when the subsequent frames are to be processed.

Figure 8:
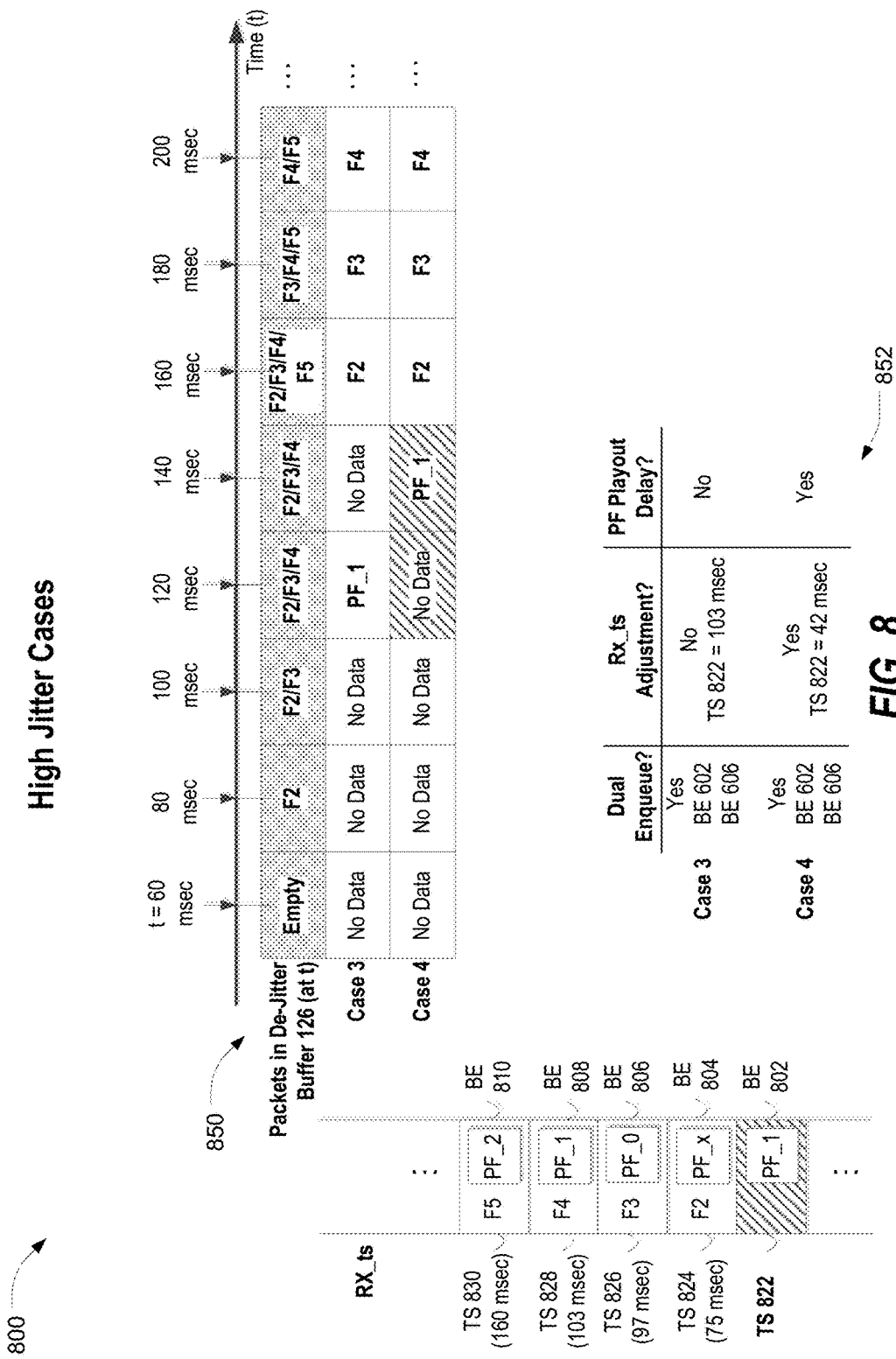
FIG. 8 is a diagram illustrating operation of particular implementations of the system of FIG. 1.

Referring to FIG. 8, a diagram illustrating operation of particular implementations of the system of FIG. 1 is shown and generally designated. The diagram 800 illustrates a comparison of when buffer entries are processed in various implementations. The diagram 800 includes a table 852 that illustrates a comparison of 2 cases corresponding to cases 3 and 4 of FIG. 6. The diagram 800 includes a table 850 that illustrates which packets are present in the de-jitter buffer 126 (shown in FIG. 8 using a shading pattern) and when buffer entries are processed in each of the 2 cases. The diagram 800 illustrates buffer entries of the de-jitter buffer 126.

The example illustrated in FIG. 8 differs from the example illustrated in FIG. 6 in that the playout delay (e.g., 80 ms) in FIG. 8 is longer than the playout delay (e.g., 40 ms) in FIG. 6. The longer playout delay (e.g., 80 ms) may correspond to situations where the destination device 102 is experiencing high jitter. Buffer entries of the de-jitter buffer 126 of FIG. 8 differ from buffer entries of the de-jitter buffer 126 of FIG. 6.

At a time t=60 ms, the de-jitter buffer 126 may be empty. The analyzer 122 of FIG. 1 may provide an indication of no data to the speech decoder 160 of FIG. 1 in response to determining that the de-jitter buffer 126 is empty.

At a time t=80 ms, the de-jitter buffer 126 may include a buffer entry 804 corresponding to the second frame (F2). A timestamp (TS) 824 of the buffer entry 804 may indicate a receive timestamp (e.g., 75 ms) of a packet that includes full frame data of the second frame (F2). The analyzer 122 of FIG. 1 may determine that a buffering period of the buffer entry 804 expires at a time t=155 ms based on the TS 824 (e.g., 75 ms) and the playout delay (e.g., 80 ms). At the time t=80 ms, the analyzer 122 may refrain from processing the buffer entry 804 in response to determining that the buffering period corresponding to the buffer entry 804 is unexpired. The analyzer 122 may play an erasure (e.g., provide a notification of no data to the speech decoder 160 of FIG. 1).

At a time t=100 ms, the de-jitter buffer 126 may include a buffer entry 806 corresponding to the third frame (F3). A TS 826 of the buffer entry 806 may indicate a receive timestamp (e.g., 97 ms) of a packet including full frame data of the third frame (F3). The analyzer 122 may determine that a buffering period corresponding to the buffer entry 806 expires at a time t=177 ms (e.g., 97 ms+80 ms). At the time t=100 ms, the analyzer 122 may refrain from processing the buffer entries 804 and 806 in response to determining that respective buffering periods are unexpired. The analyzer 122 may play an erasure (e.g., provide a notification of no data to the speech decoder 160 of FIG. 1).

At a time t=120 ms, the de-jitter buffer 126 may include a buffer entry 808 corresponding to the fourth frame (F4). A TS 828 of the buffer entry 808 may indicate a receive timestamp (e.g., 103 ms) of a packet including full frame data of the fourth frame (F4). The analyzer 122 may determine that a buffering period corresponding to the buffer entry 808 expires at a time t=183 ms (e.g., 103 ms+80 ms). The packet may also include partial data corresponding to a first frame (F1). Thus, the analyzer 122 may dual-enqueue the packet. For example, the de-jitter buffer 126 may include a buffer entry 802 corresponding to the first frame (F1). The buffer entry 802 may store a first copy of the packet, and the buffer entry 808 may store a second copy of the packet. In case 3, without receive timestamp adjustment, a TS 822 of the buffer entry 802 may indicate the receive timestamp of the packet (e.g., 103 ms). In case 4, with receive timestamp adjustment, the TS 822 of the buffer entry 802 may indicate a first time (e.g., 42 ms) that is earlier than a second time (e.g., 103 ms) indicated by the receive timestamp of the packet.

At the time t=120 ms, in case 3, the analyzer 122 may process the buffer entry 802 independently of a playout delay in response to determining that the buffer entry 802 stores partial data of the first frame (F1) and that the first frame (F1) is a next frame to be processed, as described with reference to FIG. 1. In case 4, the analyzer 122 may determine that a buffering period of the buffer entry 802 expires at a time t=122 ms (42 ms+80 ms). Thus, at the time t=120 ms in case 4, the analyzer 122 may refrain from processing the buffer entries 802, 804, 806, and 808 in response to determining that respective buffering periods are unexpired. Accordingly, the analyzer 122 may play an erasure (e.g., provide a notification of no data to the speech decoder 160 of FIG. 1).

At a time t=140 ms, in case 3, the analyzer 122 may refrain from processing the buffer entries 804, 806, and 808 in response to determining that respective buffering periods are unexpired. The analyzer 122 may play an erasure (e.g., provide a notification of no data to the speech decoder 160 of FIG. 1). In case 4, the analyzer 122 may process the buffer entry 802 in response to determining that the buffering period corresponding to the buffer entry 802 has expired.

At a time t=160 ms, the de-jitter buffer 126 may include a buffer entry 810 corresponding to the fifth frame (F5). A TS 830 of the buffer entry 810 may indicate a receive timestamp (e.g., 160 ms) of a packet including full frame data of the fifth frame (F5). The analyzer 122 may determine that a buffering period corresponding to the buffer entry 810 expires at a time t=240 ms (e.g., 160 ms+80 ms). The packet may also include partial data corresponding to the second frame (F2). The analyzer 122 may refrain from dual-enqueuing the packet in response to determining that the de-jitter buffer 126 already has the buffer entry 804 corresponding to the second frame (F2). For example, a packet including full frame data of the second frame (F2) may have been received prior to the packet including partial data of the second frame (F2). The analyzer 122 may refrain from replacing (e.g., overwriting) the full frame data with the partial data.

At the time t=160 ms, the analyzer 122 may process the buffer entry 804 corresponding to the second frame (F2) in response to determining that the buffering period corresponding to the buffer entry 804 has expired and that the second frame (F2) is a next frame to be processed, as described with reference to FIG. 1.

At a time t=180 ms, the analyzer 122 may process the buffer entry 806 corresponding to the third frame (F3) in response to determining that the buffering period corresponding to the buffer entry 806 has expired and that the third frame (F3) is a next frame to be processed, as described with reference to FIG. 1.

At a time t=200 ms, the analyzer 122 may process the buffer entry 808 corresponding to the fourth frame (F4) in response to determining that the buffering period corresponding to the buffer entry 808 has expired and that the fourth frame (F4) is a next frame to be processed, as described with reference to FIG. 1.

As illustrated in the diagram 800, an implementation corresponding to case 3 may have a difference performance than an implementation corresponding to case 4 in high jittercases. Processing partial data of a frame independently of a playout delay may reduce a likelihood that frame data corresponding to a subsequent frame has been received by a time that the subsequent frame is to be processed. In case 3, a processed signal may be generated without frame data corresponding to the subsequent frame. Processing partial data based on the playout delay may increase the likelihood that the frame data corresponding to the subsequent has been received by the time that the subsequent frame is to be processed. The processed signal may be generated based on the frame data corresponding to the subsequent frame. The processed signal generated in case 4 may have a better audio quality (e.g., fewer artifacts) than the processed signal generated in case 3.

Figure 9:
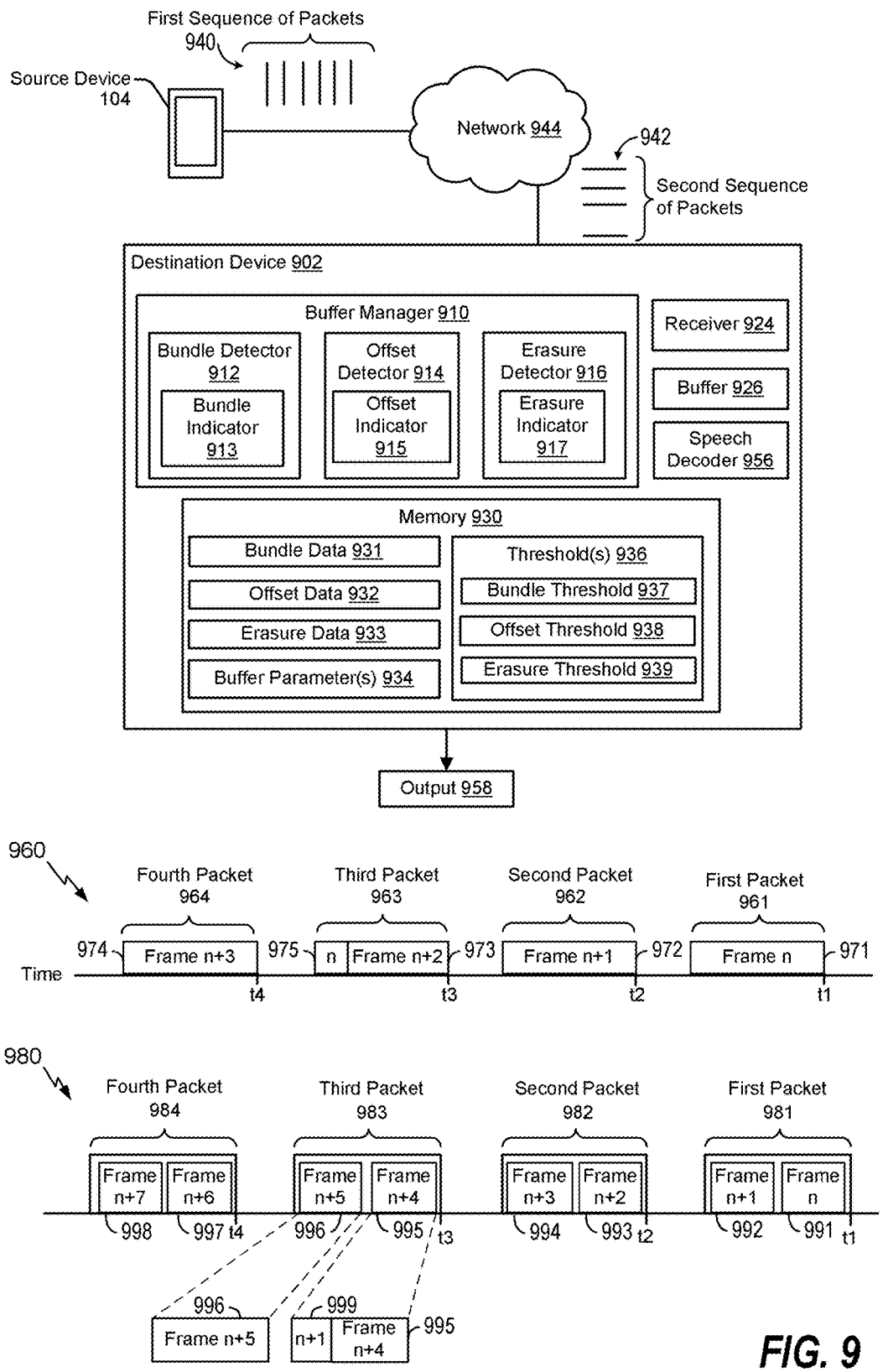
FIG. 9 is a block diagram of a particular illustrative example of a system that is operable to update a buffer parameter.

Referring to FIG. 9, a particular illustrative example of a system operable to update a buffer parameter is disclosed and generally designated 900. The system 900 may include a destination device 902 in communication with one or more other devices, such as a source device 104, via a network 944. For example, the source device 104 may be configured to communicate audio data to the destination device 902. To illustrate, the source device 104 and the destination device 902 may be engaged in a voice call, such as a voice over Internet protocol (VoIP) call. Additionally or alternatively, the destination device 902 may be configured to communicate audio data to the source device 104, and the source device 104 may be configured to receive and process the audio data. The destination device 902 may include or correspond to the destination device 102 of FIG. 1.

The source device 104 may generate a sequence of packets based on audio data to be communicated to the destination device 902. For example, the source device 104 may include a speech coder, a decoder (not shown), or a combination thereof. The speech coder may be configured to compress, divide, or compress and divide a speech signal into segments, to generate frames. The duration of each segment (or "frame") may be selected to be short enough that the spectral envelope of the signal may be expected to remain relatively stationary. As an illustrative, non-limiting example, one frame length may be twenty milliseconds, which corresponds to 160 samples at a sampling rate of eight kilohertz (kHz). It is noted that other frame lengths or sampling rates may be used.

The speech encoder, such as a vocoder, may generate multiple frames (e.g., multiple encoded audio frames) and may tag each frame with a sequence number that corresponds to an order of the multiple frames within a frame encoding sequence. A sequence number of each frame may be included in a header of the frame (e.g., a header of a vocoder packet). In some implementations, each frame may have the same size or a same maximum frame size. Each frame of the multiple frames may be included in or correspond to a vocoder packet and each vocoder packet may correspond to a frame sequence number. For example, a first frame (e.g., a first vocoder packet) may correspond to a first frame sequence number, and a second frame (e.g., a second vocoder packet) may correspond to a second frame sequence number. When the first frame is generated prior to the second frame, the first frame sequence number may be lower than the second frame sequence number, indicating that the first frame is an earlier frame (e.g., an older frame) than the second frame in a sequence of frames. The source device 104 may transmit a sequence of frames to the destination device 902 as first data packet(s) 940. The first data packet(s) 940 may include multiple, separate packets transmitted by the source device 104.

The source device 104 may transmit the first data packet(s) 940 via the network 944 to the destination device 902. The network 944 may include one or more devices, such as a server (not shown), that may enable communication between the source device 104 and the destination device 902. In some implementations, a server, such as an RTP server, may be configured to bundle frames (or packets) transmitted by the source device 104 into a bundled packet that is provided to the destination device 902. For example, the server may be configured to bundle multiple frames, such as multiple vocoder packets, into the bundled packet (e.g., a multi-frame packet). The first data packet(s) 940 may include or correspond to the first packet 132, the second packet 134, or both, of FIG. 1. The network 944 may include or correspond to the network 190 of FIG. 1.

In some implementations, the vocoder may generate a packet (e.g., a vocoder packet) of the sequence of frames to include redundant information corresponding to a previously generated frame. For example, the vocoder may generate a first vocoder packet and may generate a second vocoder packet after generating the first vocoder packet. The first vocoder packet may include a first frame. The second vocoder packet may include a second frame and a partial frame (e.g., redundant information) of the first frame. In some implementations, a partial frame may correspond to a speech frame, the loss of which would cause a significant quality impact in a processed speech signal generated at the destination device 902.

A first example of a sequence of packets that may be represented by the first data packet(s) 940 is depicted at 960. The first example 960 illustrates a sequence of frames transmitted by the source device 104 over a period of time. For example, the sequence of frames may include a first packet 961 transmitted at a first time (t1), a second packet 962 transmitted at a second time (t2), a third packet 963 transmitted at a third time (t3), and a fourth packet 964 transmitted at a fourth time (t4). In some implementations, a difference between each of the times in the first example 960 (e.g., between t1 and t2, etc.) may be the same, such as 20 ms. The first packet 961 may correspond to a first segment of a speech signal and may include a first frame 971 having a sequence number of (n). The second packet 962 may correspond to a second segment of the speech signal that is subsequent to the first segment. The second packet 962 may include a second frame 972 having a sequence number (n+1).

The third packet 963 may correspond to a third segment that is subsequent to the second segment. The third packet 963 may include a third frame 973 having a sequence number (n+2). The third packet 963 (e.g., the third frame 973) may also include a partial frame 975 that corresponds to the first frame 971. The partial frame 975 may have the sequence number (n), which is the same sequence number as the first frame 971. A particular frame that a partial frame is based on may be referred to as a primary frame, e.g., the first frame 971 is a primary frame. Because the partial frame 975 is two frames away from the first frame 971 (as indicated by a difference between the sequence number (n) of the first frame 971 and the sequence number (n+2) of the third frame 973 that includes the partial frame 975), the partial frame has an offset of two. Although the partial frame 975 is illustrated as being after the third frame 973, in other implementations the partial frame may be prior to the third frame 973 or included in the third frame 973. The fourth packet 964 may correspond to a fourth segment that is subsequent to the third segment. The fourth packet 964 may include a fourth frame 974 having a sequence number (n+3).

A second example of a sequence of multi-frame packets that may be associated with bundled packets generated by the network 944 (e.g., by a server (not shown) included in the network 944) is depicted, at 980. The second example 980 illustrates the sequence of multi-frame packets (e.g., a sequence of frames) produced by the network 944 based on frames transmitted by the source device 104 over a period of time. The frames transmitted by the source device 104 may include or correspond to the first sequence of packets 940 received by the network 944. The network 944 may generate (or transmit) the sequence of multi-frame packets based on frames of the first sequence of packets 940. For example, the sequence of multi-frame packets may include a first multi-frame packet 981 transmitted (or generated) by the network 944 at a first time (t1), a second multi-frame packet 982 transmitted (or generated) by the network 944 at a second time (t2), a third multi-frame packet 983 transmitted (or generated) by the network 944 at a third time (t3), and a fourth multi-frame packet 984 transmitted (or generated) by the network 944 at a fourth time (t4). In some implementations, a difference between each of the times of the second example 980 (e.g., between t1 and t2, between t2 and t3, etc.) may be the same, such as 40 ms. The first multi-frame packet 981 may include a first frame 991 having a sequence number (n) and a second frame 992 having a sequence number (n+1). The second multi-frame packet 982 may include a third frame 993 having a sequence number (n+2) and a fourth frame 994 having a sequence number (n+3).

The third multi-frame packet 983 may include a fifth frame 995 having a sequence number (n+4) and a sixth frame 996 having a sequence number (n+5). The fifth frame 995 may include a partial frame 999 that corresponds to the second frame 992. The partial frame 999 may have the sequence number (n+1), which is the same sequence number as the second frame 992. Because the partial frame 999 is three frames away from the second frame 992 (as indicated by a difference between the sequence number (n+1) of the second frame 992 and the sequence number (n+4) of the fifth frame 995 that includes the partial frame 999), the partial frame 999 has an offset of three. The fourth multi-frame packet 984 may include a seventh frame 997 having a sequence number (n+6) and an eighth frame 998 having a sequence number (n+7). Each of the frames 991-999 may be generated by the source device 104.

The network 944 may generate and transmit the sequence of multi-frame packets depicted in the second example 980 to the destination device 902. For example, the sequence of multi-frame packets may be transmitted over a communication channel (i.e., a wired or wireless network connection). The destination device 902 may receive a second sequence of packet(s) 942 that may be based on (or may correspond to) the first data packet(s) 940 or the sequence of multi-frame packets generated (or transmitted) by the network 944. The second sequence of packet(s) 942 may include multiple, separate packets received by the destination device 902. Due to conditions of the network 944, the first data packet(s) 940 (or the sequence of multi-frame packets of the second example 980) may be received by the destination device 902 as the second sequence of packet(s) 942 having a second sequence of packets that is different than the first sequence. For example, packets of the second data packet(s) may be out of order, corrupted (e.g., have bit errors), missing, or a combination thereof when the second sequence of packet(s) 942 is received at the destination device 902. As another example, the sequence of multi-frame packets of the second example 980 may be received out of order by the destination device 902.

The destination device 902 may include a receiver 924, a buffer 926, a buffer manager 910, a memory 930, and a speech decoder 956. For example, the receiver 924 may include or correspond to the receiver 124 of FIG. 1. The receiver 924 may be configured to receive one or more packets, such as one or more vocoder packets or one or more multi-frame packets. Packets may arrive at the receiver 924 at random or unpredictable arrival times due to variable network delays. Additionally or alternatively, the packets may arrive out of order (e.g., out of sequence with respect to the first sequence of packets 940, with respect to the sequence of multi-frame packets of the second example 980, or a combination thereof). The received packets may be provided to the buffer manager 910.

The buffer manager 910 may be configured to parse the received packets and to identify (e.g., extract) one or more frames included in each packet. For example, the buffer manager 910 may include or correspond to the analyzer 122 of FIG. 1. The buffer manager 910 may be configured to store (e.g., enqueue) frames of one or more received packets in the buffer 926. For example, the buffer 926 may include or correspond to the de-jitter buffer 126 of FIG. 1. The buffer 926, such as a de-jitter buffer, may be configured to store received frames to enable the frames to be ordered according to a sequence of frames and to reduce jitter associated with the packet arrival times. Increasing the size of the buffer 926 (e.g., a minimum playout delay) may reduce the number of late lost packets and, accordingly, may increase the number of frames in the buffer 926. The increase in the number of frames in the buffer 926 may lead to an increase in audio quality.

In some implementations, rather than storing a frame in the buffer 926, the buffer manager 910 may store a pointer (e.g., an identifier) in the buffer 926 that points to a location in a memory, such as the memory 930, where the frame is stored. For example, the memory 930 may include or correspond to the memory 176 of FIG. 1. If the buffer manager 910 identifies a partial frame included in a received packet, the buffer manager 910 may determine whether a corresponding frame (e.g., a full frame) having the same sequence number as the partial frame is included in the buffer 926. If the corresponding frame is stored in the buffer 926, the buffer manager 910 may discard the partial frame. If the corresponding frame is not stored in the buffer 926, the buffer manager 910 may dual-enqueue the received packet by inserting a first copy of the received packet and a second copy of the received packet into the buffer 926. For example, the buffer manager 910 may insert the partial frame into the buffer 926 as the first copy of the received packet. The first copy of the received packet may be inserted into the buffer 926 according to the sequence number of the partial frame. The buffer manager 910 may insert a second frame included in the received packet into the buffer 926 as the second copy of the received packet. The second copy of the received packet may be inserted into the buffer 926 according to a second sequence number of the second frame. If the corresponding frame is received after the partial frame is stored in the buffer 926, the buffer manager 910 may replace the partial frame with the full frame.

The buffer manager 910 may be configured to provide frames from the buffer 926 to the speech decoder 956. For example, the speech decoder 956 may include or correspond to the speech decoder 160 of FIG. 1. The speech decoder 956 may be configured to receive frames and to process the received frames to produce an audio output 958 in periodic blocks of time, such as 20 ms blocks. For example, the audio output 958 may include or correspond to the processed audio signal of 116 of FIG. 1. To produce a continuous audio output, the speech decoder 956 may be configured to receive a new frame periodically (e.g., at a regular interval). For example, the speech decoder 956 may be configured to receive a new frame every 20 ms.

To provide frames to the speech decoder 956 in a proper order (e.g., a sequential order), the buffer manager 910 may maintain a counter (not shown) that indicates a next sequence number of a frame to be provided to the speech decoder 956. Based on the value of the counter, the buffer manager 910 may dequeue a frame from the buffer 926 when the frame has a sequence number that matches the value of the counter. The dequeued frame may then be provided to the speech decoder 956. After the frame is provided to the speech decoder 956, the buffer manager 910 may increment the value of the counter.

Frames may be maintained in the buffer 926 according to a buffer parameter 934. For example, the buffer parameter 934 may include or correspond to the playout delay 128 of FIG. 1. The buffer parameter 934 may be stored in the memory 930. In some implementations, the buffer parameter 934 may be referred to as a playout delay (e.g., a buffer depth) or a playout delay parameter. The playout delay may indicate a minimum amount of time or a maximum amount of time that a frame is to stay in the buffer 926. In some implementations, the playout delay may indicate a minimum amount of time or a maximum amount of time between a frame being received at the buffer manager 910 and the frame being provided to the speech decoder 956. The minimum amount of time may be referred to as a minimum playout delay, and the maximum amount of time may be referred to as a maximum playout delay. During operation of the destination device 902, the buffer manager 910 may compute and update one or more values of the buffer parameter 934 based on jitter. For example, a higher playout delay may be used when a jitter value is higher and a lower playout delay may be used when a jitter value is lower or zero. It is noted that an increase in the minimum playout delay may reduce a number of late lost packets (e.g., packets that arrive too late to be used by the speech decoder 956) at the expense of an increased end-to-end delay between the source device 104 and the destination device 902.

If a frame to be provided to the speech decoder 956 based on the value of the counter is missing (e.g., the frame is not in the buffer 926), the buffer manager 910 may use an implicit buffer adaptation technique. The implicit buffer adaptation technique may be used to increase the effective delay of the packet playout. The implicit buffer adaptation technique does not explicitly increase the buffer parameter 934, but increases the time a packet stays in the buffer 926. To implement the implicit buffer adaptation technique, the buffer manager 910 plays out an erasure if a particular frame corresponding to the value of the counter is missing. However, if the particular frame (or a partial frame corresponding the particular frame) arrives within a threshold amount of time (e.g., 20 ms), the particular frame may be provided to the speech decoder 956 and played out. The implicit buffer adaptation technique may increase an overall delay for frames subsequent to the erasure or the particular frame. For example, a first portion of a sequence of frames may include audio data corresponding to speech (e.g., a talk spurt). In this example, recovery from the increased overall delay may occur during a second portion of the sequence of frames corresponding to a period of silence following the first portion of the sequence of frames (e.g., the talk spurt), such as after the sequence of frames have been received and processed by the speech decoder 956.

In some implementations, the buffer parameter 934 (e.g., the minimum playout delay) may have a value of approximately 40 ms, as an illustrative, non-limiting example. When the buffer parameter is 40 ms, the destination device 902 may experience an increase in erasures when partial frames have an offset of 3 and are included in multi-frame packets. For example, referring to the second example 980, the partial frame 999 (corresponding to the second frame 992) is transmitted after the fifth frame 995 is generated and included in the third multi-frame packet 983. Accordingly, the destination device 902 has to wait 80 ms (e.g., two 40 ms intervals), assuming no delay, to receive the partial frame 999 in the event that the second frame 992 is lost or corrupt. With a buffer parameter 934 of 40 ms, the partial frame 999 may not be received in time to be used in lieu of the missing second frame 992 and an erasure may occur. Additionally, because multi-frame packets include two or more vocoder packets, loss of a multi-frame packet results in two missing frames that may each result in an erasure. Accordingly, the use of multi-frame packets and offset values more than 2 may create a situation of an increased erasure rate of the destination device 902 if the buffer parameter 934 is maintained at 40 ms.

To identify situations that may result in an increased erasure rate, the buffer manager 910 may include a bundle detector 912, an offset detector 914 and an erasure detector 916. The buffer manager 910 may be configured to adjust a value of the buffer parameter 934 in response to one or more indicators generated by the bundle detector 912, the offset detector 914, or the erasure detector 916, as described herein. Each of the bundle detector 912, the offset detector 914, and the erasure detector 916 may be configured to generate corresponding data that is stored in the memory 930. For example, the bundle detector 912 may generate bundle data 931. The offset detector 914 may generate offset data 932, and the erasure detector 916 may generate erasure data 933. The offset data 932 may include or correspond to the frame offset 136 of FIG. 1.

The bundle data 931 may include first data associated with a number of frames (e.g., speech frames) that are bundled together in a multi-frame packet. For example, the bundle data 931 may be associated with an average number of frames included in multiple packets received during a time period. For example, during a first time period, the destination device 902 may receive a first packet, followed by a second packet, followed by a third packet. The bundle data 931 may store a first data entry that indicates a first number of frames included in the first packet, a second data entry that indicates a second number of frames included in the second packet, and a third data entry that indicates a third number of frames included in the third packet. As an average number of frames included in each packet increases, so does an average interval time between consecutive packets. The offset data 932 may track an offset value for each partial frame received during a second time period. The erasure data 933 may track a number of erasures (e.g., playing an erasure, a silence frame, or a no data frame) provided to the speech decoder 956 during a third time period.

Each of the bundle detector 912, the offset detector 914, and the erasure detector 916 may be configured to generate a corresponding indicator. For example, the bundle detector 912 may generate a bundle indicator 913, the offset detector 914 may generate an offset indicator 915, and the erasure detector 916 may generate an erasure indicator 917. To illustrate, the bundle detector 912 may generate the bundle indicator 913 based on the bundle data 931. The bundle indicator 913 may indicate an average number of frames (e.g., an average number of vocoder packets) per packet received by the destination device 902. The bundle indicator 913 may calculate the average number of frames per packet based on a predetermined number of most recently received packets (e.g., the five most recently received packets) or based on packets received during a first time period (e.g., packets received during the last 400 ms). Additionally or alternatively, the bundle indicator 913 may indicate whether or not multi-frame packets are being received by the destination device 902. For example, the bundle indicator 913 may have a logical 1 value to indicate that multi-frame packets are being received and may have a logical 0 value to indicate that multi-frame packets are not being received. Additionally or alternatively, the bundle indicator 913 may indicate an average time interval between consecutive packets received by the destination device 902.

The offset detector 914 may generate the offset indicator 915 based on the offset data 932. The offset indicator 915 may indicate an average offset of one or more partial frames received during a second time period. The erasure detector 916 may generate the erasure indicator 917 based on the erasure data 933. The erasure indicator 917 may indicate an average number of erasures during a third time period. Additionally or alternatively, the erasure indicator 917 may indicate a frame erasure rate as a percentage of erasures. The percentage of erasures may indicate a number of erasures provided to the speech decoder 956 during the third time period divided by a total number of frames to be provided to the speech decoder 956 during the third time period.

The buffer manager 910 may compare one or more of the indicators 913, 915, 917 to a corresponding threshold. The memory 930 may store one or more thresholds 936, such as a bundle threshold 937, an offset threshold 938, and an erasure threshold 939. The bundle detector 912 may compare the bundle indicator 913 to the bundle threshold 937, the offset indicator 915 to the offset threshold 938, the erasure indicator 917 to the erasure threshold 939, or a combination thereof.

The bundle threshold 937 may have a value of 1.5, as an illustrative, non-liming example. If the bundle indicator 913 is greater than or equal to the value of 1.5, the bundle detector 912 may determine that multi-frame packets (e.g., bundled packets) are being received by the destination device 902. As another example, when the bundle indicator 913 corresponds to an average time interval between consecutive packets, the bundle threshold 937 may have a value of 30 ms. For example, when the source device 104 generates and transmits frames as vocoder packets every 20 ms, the frames may be received at the destination device 902 every 20 ms assuming no delay. However, when the network 944 generates multi-frame packets, the multi-frame packets may be generated (or transmitted) at least every 40 ms (e.g., corresponding to an amount of time to generate two vocoder packets). The multi-frame packets may be received at the destination device 902 every 40 ms assuming no delay. Accordingly, when the bundle indicator 913 (indicating an average interval between consecutive frames received by the destination device 902) is greater than or equal to the bundle threshold 937 (e.g., 30 ms), the buffer manager 910 may determine that multi-frame packets are being received by the destination device 902. Because packets are being received less frequently when multi-frame packets are received as compared to when non-multi-frame packets are received, the buffer manager 910 may increase the buffer parameter 934 to increase the playout delay (e.g., buffer depth) and, accordingly, the time a packet remains in the buffer 926. The increase in the buffer depth allows the buffer manager 910 to have more partial frames available for frame recovery. In some implementations, the destination device 902 may recover missing or corrupted frames using partial frames according to one or more standards, such as a $3^{rd}$ Generation Partnership Project (3GPP) standard (e.g., an Enhanced Voice Services (EVS) 3GPP standard), as an illustrative, non-limiting example.

The offset threshold 938 may have a value of 2.5, as an illustrative, non-limiting example. For example, when the buffer parameter 934 is 40 ms and multi-frame packets including two vocoder packets are received every 40 ms (assuming no delay), a partial frame having an offset value of 2 may be received by the destination device 902 and be available in the event that a corresponding full frame is missing. However, if a partial frame has an offset value of 3 and multi-frame packets including two vocoder packets are received every 40 ms (assuming no delay), the partial frame may be received after 80 ms, which may be too late when the partial frame is needed to recover a missing frame. Accordingly, when the offset indicator 915 (e.g., an average offset of one or more partial frames received by the destination device 902) is greater than or equal to the offset threshold 938 (e.g., 2.5), the buffer manager 910 may determine to increase the buffer parameter 934 by providing additional buffer depth (e.g., increasing the playout delay) to increase the time a frame stays in the buffer 926. Increasing the time the frame stays in the buffer before playout of the frame allows the buffer manager 910 to receive an increased amount of partial frames before playout of the frame. The buffer manager 910 may use the increased amount of partial frames for frame recovery.

The erasure threshold 939 may have a value between 3%-5%, as an illustrative, non-limiting example. The buffer manager 910 may consider an erasure rate corresponding to 3%-5% to be a high erasure rate that may result in a reduced quality of the audio output 958. Accordingly, when the erasure indicator 917 (the erasure rate) is greater than or equal to the erasure threshold 939 (e.g., 4%), the buffer manager 910 may increase the buffer parameter 934 by providing additional buffer capacity to receive partial frames in time to use the partial frames for frame recovery, which may reduce the erasure rate.

In response to one or more of the indicators 913, 915, 917 satisfying (e.g., being greater than or equal to) a corresponding threshold, the buffer manager 910 may update the buffer parameter 934. For example, the buffer manager 910 may explicitly increase the buffer parameter 934, such as increasing a minimum playout value. To illustrate, the buffer parameter 934 may be increased from a first minimum playout value (e.g., 40 ms) to a second minimum playout value (e.g., 80 ms) in response to one or more of the indicators 913, 915, 917 satisfying a corresponding threshold. The buffer manager 910 may adjust the buffer parameter 934 during a silence period. During the silence period, no packets (including encoded audio data) may be received by the destination device 902. For example, the silence period may occur between two different speech periods. Increasing the buffer parameter 934 may enable more partial frames to be available in the buffer 926 for frame recovery and may reduce an erasure rate.

After the buffer parameter 934 is set to the second minimum playout value, the buffer parameter 934 may be set back to the first minimum playout value when the one or more indicators 913, 915, 917 no longer satisfy the corresponding threshold. For example, when the buffer parameter 934 was set to the second value in response to the erasure indicator 917 being greater than or equal to the erasure threshold 939, the buffer parameter 934 may be set to the first value in response to the erasure indicator 917 being less than the erasure threshold 939.

During operation, the destination device 902 may set the buffer parameter 934 to a first value, such as an initial value of 20 ms. The destination device 902 may receive the second sequence of packets 942 that correspond to a period of speech. The buffer manager 910 may order frames received in the second sequence of packets 942 using the buffer 926. The buffer manager 910 may provide ordered frames from the buffer 926 (or the memory 930) to the speech decoder 956 to enable the speech decoder 956 to generate the audio output 958.

In addition to ordering the frames and providing the frames to the speech decoder 956, the buffer manager 910 may generate the indicators 913, 915, 917 and compare each of the indicators 913, 915, 917 to a corresponding threshold. In response to one or more of the indicators 913, 915, 917 satisfying a corresponding threshold, the buffer manager 910 may update the buffer parameter 934 to a second value. For example, the buffer manager 910 may update the buffer parameter 934 during a period of silence following the period of speech. Accordingly, the buffer parameter 934 having the second value may be used during a second period of speech that follows the period of silence.

For example, at a particular time, the buffer parameter 934 may have a first value, such as a default value, that is selected to enable an acceptable frame erasure rate when vocoder packets (e.g., non-bundled RTP packets) are received and when partial frames have a particular offset value (e.g., the number of packets between partial frames and the corresponding full frame), such as a value of two or less. The buffer manager may be configured to update (e.g., increase) the value of the buffer parameter 934 to a second value if the buffer manager 910 determines that the frame erasure rate is unacceptable, that RTP packets (e.g., multi-frame bundled packets) are being received, that partial frames have an offset value greater than the particular offset value, or a combination thereof.

In some implementations, the buffer parameter 934 may be updated in response to all three of the indicators 913, 915, 917 satisfying a corresponding threshold, as described with reference to FIG. 12. In other implementations, the buffer parameter 934 may be updated in response to two out of the three indicators 913, 915, 917 satisfying a corresponding threshold. In other implementations, a particular indicator may be compared to multiple threshold values. The buffer parameter 934 may be updated to a first value in response to the particular indicator being less than a first threshold and a second threshold. The buffer parameter 934 may be updated to a second value in response to the particular indicator being greater than or equal to the first threshold or in response to the particular indicator being greater than or equal the second threshold and another indicator satisfying a condition. Using multiple thresholds may allow the buffer manager to quickly update the buffer parameter in response to the particular indicator being greater than or equal to the first threshold without having to compare another indicator to a corresponding threshold.

By tracking historic data, such as the bundle data 931, the offset data 932, the erasure data 933, or a combination thereof, the destination device 902 may be able to identify one or more conditions that are indicative of (e.g., that may lead to) an increased erasure rate which may degrade the audio output 958 quality. In response to identifying the one or more conditions, the destination device 902 may dynamically update the buffer parameter 934 to provide additional buffer capacity to receive partial frames in time to use the partial frames for frame recovery. For example, when partial frames are present in a received stream of packets, the destination device 902 may increase a minimum playout delay in response to one or more conditions, such as use of multi-frame packet bundling, that may result in a high erasure rate. For example, the updated buffer parameter may enable more partial frames to be included in the buffer 926. Accordingly, more partial frames will be available for the buffer 926 to use to recover missing frames. By having an increased number of partial frames available in the buffer 926, more missing frames may be recovered and fewer erasures may be generated. Recovering more missing frames and reducing a number of erasures may reduce a frame erasure rate and may improve quality of the audio output 958. Additionally, the buffer parameter 934 may be reset to an original value when the one or more conditions are no longer present because permanently increasing the buffer parameter 934 may adversely impact an end-to-end delay between the source device 104 and the destination device 902.

One particular advantage provided by the system 900 is that the buffer parameter 934 of the buffer 926 may be dynamically updated based on one or more indicators corresponding to one or more detected conditions. The updated parameter may not permanently increase an end-to-end delay between the source device 104 and the destination device 902 because the increase in the buffer parameter 934 may be temporary. The buffer parameter 934 may be reset back to the first (lower) value in response to the one or more detected conditions improving. Additionally, the updated parameter may enable an audio output to be generated that has an increased level of quality.

Referring to FIG. 10, a flow chart of a particular illustrative implementation of a method of updating a de-jitter buffer is shown and is generally designated 1000. In a particular implementation, one or more operations of the method 1000 may be executed by at least one of the destination device 102, the de-jitter buffer 126, the analyzer 122 of FIG. 1, the destination device 902, the buffer 926, or the buffer manager 910 of FIG. 9.

The method 1000 includes receiving a packet at a de-jitter buffer, at 1002. For example, the de-jitter buffer 126 of FIG. 1 may receive the second packet 134, as described with reference to FIG. 1. The second packet 134 may include the first partial data 174 and the second frame data 166, as described with reference to FIG. 1. The first partial data 174 may include a partial copy of the first frame data 164 corresponding to the first frame 184 of a sequence of frames corresponding to the input audio signal 130. The second frame data 166 may correspond to the second frame 186 of the sequence of frames.

The method 1000 also includes generating a first frame receive timestamp associated with the first data, at 1004. For example, the analyzer 122 of FIG. 1 may generate the first receive timestamp 140, as described with reference to FIG. 1. The analyzer 122 of FIG. 1 may also store the first receive timestamp 140 in a first buffer entry 114 of the de-jitter buffer 126, as described with reference to FIG. 1. The first buffer entry 114 may correspond to the first frame 184, as described with reference to FIG. 1.

The method 1000 further includes generating a second frame receive timestamp associated with the second data, at 1006. For example, the analyzer 122 of FIG. 1 may generate the second receive timestamp 150, as described with reference to FIG. 1. The analyzer 122 of FIG. 1 may also store the second receive timestamp 150 in a second buffer entry 118 of the de-jitter buffer 126, as described with reference to FIG. 1. The second buffer entry 118 may correspond to the second frame 186. The first frame receive timestamp 140 may indicate a first time that is earlier than a second time indicated by the second receive timestamp 150, as described with reference to FIG. 1.

In some implementations, the method 1000 may include receiving a plurality of packets. The method 1000 may include determining at least one of a frame erasure rate, an offset value, or a frame bundling value based on the plurality of packets. The method 1000 may further include updating a parameter associated with a buffer in response to at least one of the frame erasure rate being greater than or equal to a first threshold, the offset value being greater than or equal to a second threshold, or the frame bundling value being greater than or equal to a third threshold.

In some implementations, the method 1000 may include updating a parameter associated with a buffer in response to a determination that a frame erasure rate satisfies a first threshold, an offset value satisfies a second threshold, and a frame bundling value satisfies a third threshold. The frame bundling value may be based on the plurality of packets. Updating a parameter may include changing a value of the parameter from a first value to a second value. The method 1000 may also include, after the parameter is updated, changing the value of the parameter from the second value to the first value in response to the frame erasure rate being less than the first threshold, the offset value being less than the second threshold, or the frame bundling value being less than the third threshold.

The method 1000 may enable processing of the first buffer entry 114 prior to expiration of a buffering period that is based on the second receive timestamp 150. Generating the first receive timestamp 140 may enable the first frame 184 to be processed prior to expiration of the buffering period associated with the second packet 134 when the first frame 184 is a next frame to be processed.

Referring to FIG. 11, a flow chart of a particular illustrative implementation of a method of updating a de-jitter buffer is shown and is generally designated 1100. In a particular implementation, one or more operations of the method 1100 may be executed by at least one of the destination device 102, the de-jitter buffer 126, the analyzer 122 of FIG. 1, the destination device 902, the buffer 926, or the buffer manager 910 of FIG. 9.

The method 1100 includes receiving a packet at a de-jitter buffer, at 702. For example, the de-jitter buffer 126 of FIG. 1 may receive the second packet 134, as described with reference to FIG. 1. The second packet 134 may include the first partial data 174 corresponding to the first frame 184 of a sequence of frames of the input audio signal 130, as described with reference to FIG. 1. The method 1100 also includes detecting that an erasure corresponding to the first frame has been played, at 1104. For example, the analyzer 122 of FIG. 1 may detect that an erasure corresponding to the first frame 184 has been played, as described with reference to FIG. 1.

The method 1100 further includes storing the first data in a first buffer entry of the de-jitter buffer, at 1106. For example, the analyzer 122 of FIG. 1 may store the first partial data 174 in the first buffer entry 114 of the de-jitter buffer, as described with reference to FIG. 1.

The method 1100 may enable frame data (e.g., full frame data or partial data) of a frame to be included in a de-jitter buffer subsequent to playing an erasure corresponding to the frame. Processing of the frame data (e.g., the full frame data or the partial data) of the frame subsequent to playing an erasure corresponding to the frame may enable implicit buffer adaptation by implicitly increasing a buffer depth of the de-jitter buffer.

Referring to FIG. 12, a flow chart of a particular illustrative implementation of a method of adjusting a buffer parameter is disclosed and generally designated 1200. The buffer parameter may include or correspond to the playout delay 128 of FIG. 1 or the buffer parameter 934 of FIG. 9. The method 1200 may be performed by the source device 104, the destination device 102 (e.g., the analyzer 122) of FIG. 1, or the destination device 902 (e.g., the buffer manager 910) of FIG. 9. FIG. 12 illustrates adjustment of the buffer parameter in response to a combination of a bundle indicator, an offset indicator, and an erasure indicator.

The method 1200 includes determining whether a bundle indicator is greater than or equal to a bundle threshold, at 1202. The bundle indicator may include or correspond to the bundle data 931, the bundle indicator 913 of FIG. 9, or a combination thereof. The bundle threshold may include or correspond to the bundle threshold 937 of FIG. 9. In response to a determination that the bundle indicator is less than the bundle threshold, the method 1200 may advance to 1208. At 1208, the buffer parameter may be set to a first value. In some implementations, the first value may include or correspond to a default value, such as a value of 40 ms, as an illustrative, non-limiting example. If the buffer parameter is already set to the first value, the value of the buffer parameter may not change. After setting the buffer parameter to the first value, the method 1200 may advance to 1202. In response to a determination that the bundle indicator is greater than or equal to the bundle threshold, the method 1200 may advance to 1204.

The method 1200 includes determining whether an offset indicator is greater than or equal to an offset threshold, at 1204. The offset indicator may include or correspond to the frame offset 136 of FIG. 1, the offset data 932, the offset indicator 915 of FIG. 9, or a combination thereof. The offset threshold may include or correspond to the offset threshold 938 of FIG. 9. In response to a determination that the offset indicator is less than the offset threshold, the method 1200 may advance to 1208. In response to a determination that offset indicator is greater than or equal to the offset threshold, the method 1200 advances to 1206.

The method 1200 includes determining whether an erasure indicator is greater than or equal to an erasure threshold, at 1206. The erasure indicator may include or correspond to the erasure data 933, the erasure indicator 917 of FIG. 9, or a combination thereof. The erasure threshold may include or correspond to the erasure threshold 939 of FIG. 9. In response to a determination that the erasure indicator is less than the erasure threshold, the method 1200 may advance to 1208. In response to a determination that erasure indicator is greater than or equal to the erasure threshold, the method 1200 may advance to 1210.

At 1210, the buffer parameter may be set to a second value. In some implementations, the second value may be greater than the first value. If the buffer parameter is already set to the second value, the value of the buffer parameter may not be changed. After setting the buffer parameter to the second value, the method 1200 may advance to 1202. Accordingly, the method 1200 illustrates setting the buffer parameter to the second value when three conditions are satisfied and setting the buffer parameter to the first value when less than the three conditions are satisfied. Although FIG. 12 illustrates a particular order in which comparisons are performed, the comparisons may be performed in another order or one or more of the comparisons may be performed concurrently (e.g., at the same time).

In an alternative implementation, the buffer parameter may be updated in response to two out of three conditions being satisfied. The conditions may include a bundle indicator, an offset indicator, and an erasure indicator being greater than or equal to a corresponding threshold. For example, the buffer parameter is set to a second value when two of the three conditions are satisfied and is set to a first value when two or more conditions are not satisfied.

In another alternative implementation, multiple thresholds may be used for the indicators. For example, multiple thresholds may be used for the offset indicator. The alternative implementation may include determining whether an offset indicator is greater than or equal to a first offset threshold and determining whether the offset indicator is greater than or equal to a second offset threshold. In response to a determination that the offset indicator is greater than or equal to the first offset threshold, the buffer parameter may be set to a second value. If the buffer parameter is already set to the second value, the value of the buffer parameter may not be changed. In response to a determination that the offset indicator is less than the first offset threshold, the offset indicator may be compared to the second offset threshold.

In response to a determination that the offset indicator is less than the second offset threshold, the buffer parameter may be set to a first value. If the buffer parameter is already set to the first value, the value of the buffer parameter may not be changed. In response to a determination that the offset indicator is greater than or equal to the second offset threshold, an erasure indicator may be compared to an erasure threshold.

In response to a determination that the erasure indicator is less than the erasure threshold, the buffer parameter may be set to the first value. In response to a determination that the erasure indicator is greater than or equal to the erasure threshold, the buffer parameter may be set to the second value. Accordingly, the buffer parameter is set to the second value when two of the three conditions (e.g., the offset indicator greater than or equal to the first offset threshold, the offset indicator greater than or equal to the second offset threshold, and the erasure indicator greater than or equal to the erasure threshold) are satisfied and is set to the first value when two or more conditions are not satisfied.

The method 1200 enables dynamic adjustment of the parameter. For example, the parameter may be adjusted (e.g., increased) to enable more partial frames to be stored in the buffer and to be available for frame recovery operations. Enabling more partial frames to be stored in the buffer may reduce the frame erasure rate.

The methods of FIGS. 10-12 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, one or more of the methods of FIGS. 10-12, individually or in combination, may be performed by a processor that executes instructions, as described with respect to FIGS. 1 and 9.

Referring to FIG. 13, a block diagram of a particular illustrative implementation of a device (e.g., a wireless communication device) is depicted and generally designated 1300. In various implementations, the device 1300 may have more or fewer components than illustrated in FIG. 13. In an illustrative implementation, the device 1300 may correspond to one or more of the destination device 102, the source device 104 of FIG. 1, and the destination device 902 of FIG. 9. In an illustrative implementation, the device 1300 may operate according to one or more of the systems or methods described with reference to FIGS. 1-12.

In a particular implementation, the device 1300 includes a processor 1306 (e.g., a central processing unit (CPU)). The device 1300 may include one or more additional processors 1310 (e.g., one or more digital signal processors (DSPs)). The processors 1310 may include a speech and music coder-decoder (CODEC) 1308 and an echo canceller 1312. The speech and music codec 1308 may include a vocoder encoder 1336, a vocoder decoder 1338, or both.

The device 1300 may include the memory 176 of FIG. 1 and a CODEC 1334. The memory 176 may include the analysis data 120. Although not shown, the memory 176 may also include the historic data (e.g., 931-933), the thresholds 936, and the buffer parameter 934 of FIG. 9. The device 1300 may include a wireless controller 1340 coupled, via a transceiver 1350, to an antenna 1342. In a particular implementation, the transceiver 1350 may include the receiver 124 of FIG. 1.

The device 1300 may include a display 1328 coupled to a display controller 1326. The speaker 142 of FIG. 1, the microphone 1346, or both, may be coupled to the CODEC 1334. The CODEC 1334 may include a digital-to-analog converter 1302 and an analog-to-digital converter 1304. In an illustrative implementation, the microphone 1346 may correspond to the microphone 146 of FIG. 1. In a particular implementation, the CODEC 1334 may receive analog signals from the microphone 146, convert the analog signals to digital signals using the analog-to-digital converter 1304, and provide the digital signals to the speech and music codec 1308. The speech and music codec 1308 may process the digital signals. In a particular implementation, the speech and music codec 1308 may provide digital signals to the CODEC 1334. The CODEC 1334 may convert the digital signals to analog signals using the digital-to-analog converter 1302 and may provide the analog signals to the speaker 142.

The device 1300 may include the analyzer 122, the de-jitter buffer 126, the speech decoder 160, or a combination thereof. The analyzer 122, the de-jitter buffer 126, the speech decoder 160 may include or correspond to the buffer manager 910, the buffer 926, the speech decoder 956, respectively, of FIG. 9. In a particular implementation, the analyzer 122, the speech decoder 160, or both, may be included in the processor 1306, the processors 1310, the CODEC 1334, the speech and music codec 1308, or a combination thereof. In a particular implementation, the analyzer 122, the speech decoder 160, or both, may be included in the vocoder encoder 1336, the vocoder decoder 1338, or both.

The analyzer 122, the de-jitter buffer 126, the speech decoder 160, or a combination thereof, may be used to implement a hardware implementation of updating the de-jitter buffer technique described herein. Alternatively, or in addition, a software implementation (or combined software/hardware implementation) may be implemented. For example, the memory 176 may include instructions 1356 executable by the processors 1310 or other processing unit of the device 1300 (e.g., the processor 1306, the CODEC 1334, or both). The instructions 1356 may include one or more instructions that are executable by the processor 1306 and/or the processors 1310 to perform one or more of the methods of FIGS. 10-12. The instructions 1356 may be executable to implement operations attributed to the analyzer 122, the speech decoder 160, or both.

In a particular implementation, the device 1300 may be included in a system-in-package or system-on-chip device 1322. In a particular implementation, the analyzer 122, the de-jitter buffer 126, the speech decoder 160, the memory 176, the processor 1306, the processors 1310, the display controller 1326, the CODEC 1334, and the wireless controller 1340 are included in a system-in-package or system-on-chip device 1322. In a particular implementation, an input device 1330 and a power supply 1344 are coupled to the system-on-chip device 1322. Moreover, in a particular implementation, as illustrated in FIG. 13, the display 1328, the input device 1330, the speaker 142, the microphone 1346, the antenna 1342, and the power supply 1344 are external to the system-on-chip device 1322. In a particular implementation, each of the display 1328, the input device 1330, the speaker 142, the microphone 1346, the antenna 1342, and the power supply 1344 may be coupled to a component of the system-on-chip device 1322, such as an interface or a controller.

The device 1300 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In an illustrative implementation, the processors 1310 may be operable to perform all or a portion of the methods or operations described with reference to FIGS. 1-12. As an illustrative example, the processors 1310 may be configured to execute software (e.g., a program of one or more instructions 1356) stored in the memory 176. For example, the processors 1310 may be configured to operate in accordance with the method 1000 of FIG. 10, the method 1100 of FIG. 11, the method 1200 of FIG. 12, or a combination thereof. To illustrate, the processors 1310 may be configured to execute the instructions 1356 that cause the processors 1310 to perform the operations of processing a first packet at a de-jitter buffer, the first packet including first data and second data. The first data includes a partial copy of first frame data corresponding to a first frame of a sequence of frames and the second data corresponds to a second frame of the sequence of frames. The processor may also perform the operations of generating a first frame receive timestamp associated with the first data and generating a second frame receive timestamp associated with the second data. The first frame receive timestamp indicates a first time that is earlier than a second time indicated by the second frame receive timestamp. The processor may also perform the operations of processing the first data and second data to generate a processed speech signal.

As another illustrative example, the microphone 1346 may capture an audio signal corresponding to a user speech signal. The ADC 1304 may convert the captured audio signal from an analog waveform into a digital signal comprised of digital audio samples. The processors 1310 may process the digital audio samples. A gain adjuster may adjust the digital audio samples. The echo canceller 1312 may reduce echo that may have been created by an output of the speaker 142 entering the microphone 1346.

The vocoder encoder 1336 may compress digital audio samples corresponding to the processed speech signal and may form a sequence of packets (e.g., a representation of the compressed bits of the digital audio samples). The sequence of packets may be stored in the memory 176. One or more packets of the sequence may include partial copies of other packets of the sequence. The transceiver 1350 may modulate some form of each packet (e.g., other information may be appended to the packet) of the sequence and may transmit the modulated data via the antenna 1342.

As a further example, the antenna 1342 may receive incoming packets corresponding to a sequence of packets sent by another device via a network. The received packets may correspond to a sequence of frames of a user speech signal.

The analyzer 122 may store the incoming packets in the de-jitter buffer 126 (e.g., a de-jitter buffer). The analyzer 122 may store multiple copies of one or more of the incoming packets in the de-jitter buffer 126. For example, the analyzer 122 may store, in the de-jitter buffer 126, a first copy of a packet in a first buffer entry corresponding to a first frame and a second copy of the packet in a second buffer entry corresponding to a second frame. The packet may include a partial copy of frame data of the first frame and may include a full copy of frame data of the second frame. In another example, the de-jitter buffer may be configured to receive a packet including first data and second data. The first data may include a partial copy of first frame data corresponding to a first frame in a sequence of frames. The second data may correspond to a second frame in the sequence of frames. The analyzer 122 may be configured to, in response to receiving the packet, generate a first frame receive timestamp associated with the first data and generate a second frame receive timestamp associated with the second data. The analyzer 122 may be configured to generate the first frame receive timestamp based on the second frame receive timestamp and based on a frame offset between the first frame and the second frame. For example, the analyzer 122 may determine the first receive timestamp based on the equation: FRTS=PRTS−(FO*FPD)−1 millisecond, where FRTS=the first receive timestamp, PRTS=the receive timestamp of the second packet, FO=the frame offset, and FPD=a frame playout duration. The analyzer 122 may be configured to store the first frame receive timestamp in the first buffer entry and may be configured to store the second frame receive timestamp in the second buffer entry. The first frame receive timestamp may indicate a first time that is earlier than a second time indicated by the second frame receive timestamp.

The packet may also indicate a second generation timestamp of the second frame. The analyzer 122 may be further configured to determine a first generation timestamp of the first frame based on the frame offset and the second generation timestamp and to store the first frame receive timestamp in the first buffer entry in response to determining that the first generation timestamp exceeds a generation timestamp of a particular frame, the particular frame being a most recently processed frame. For example, the analyzer 122 may determine the first generation timestamp based on the equation: the first generation timestamp=(the second generation timestamp 158−(the frame offset 136*a number of samples per frame)).

The analyzer 122 may process the first buffer entry based on a playout delay and the first frame receive timestamp or the first generation timestamp. The analyzer 122 may provide the partial copy of the frame data of the first frame or the first copy of the packet to the vocoder decoder 1338. The vocoder decoder 1338 may uncompress the partial copy.

The uncompressed waveform may be referred to as reconstructed audio samples. The echo canceller 1312 may remove echo from the reconstructed audio samples. The speech decoder 160 may generate a processed speech signal based on the reconstructed audio samples. A gain adjuster may amplify or suppress the processed speech signal. The DAC 1102 may convert the processed speech signal from a digital signal to an analog waveform and may provide the converted signal to the speaker 142.

The analyzer 122 may store frame data of a frame in the de-jitter buffer 126 independently of detecting that an erasure corresponding to the frame has been played. Processing the frame subsequent to playing the erasure may enable implicit buffer adaptation by implicitly increasing a depth of the de-jitter buffer 126. Additionally, the analyzer 122 may adjust a buffer parameter 934 in response to comparing, a bundle indicator, an offset indicator, an erasure indicator, or a combination thereof, to one or more thresholds.

In conjunction with the described implementations, an apparatus may include means for receiving a packet including first data and second data. For example, the means for receiving the packet may include the receiver 124 of FIG. 1, the receiver 924 of FIG. 9, the transceiver 1350, one or more other devices, circuits, modules, or instructions configured to receive a packet, or a combination thereof. The first data may include a partial copy of first frame data corresponding to a first frame of a sequence of frames. The second data may correspond to a second frame of the sequence of frames.

The apparatus may also include means for performing buffer management, including means for generating a first frame receive timestamp associated with the first data in response to receiving the packet and means for generating a second frame receive timestamp associated with the second data in response to receiving the packet. For example, the means for performing buffer management, the means for generating the first frame receive timestamp, and the means for generating the second frame receive timestamp may include the analyzer 122, the buffer manager 910, the processor 1306, the processors 1310, the CODEC 1334, or a combination thereof. The first frame receive timestamp may indicate a first time that is earlier than a second time indicated by the second frame receive timestamp. In some implementations, the means for performing buffer management may further perform the function of storing the first frame receive timestamp in a first buffer entry of a de-jitter buffer and storing the second frame receive timestamp in a second buffer entry of the de-jitter buffer. The first buffer entry may correspond to the first frame. The second buffer entry may correspond to the second frame. The means for performing buffer management may further perform the function of processing the first buffer entry and processing the second buffer entry. In an illustrative implementation, the means for performing buffer management may be further configured to update a buffer parameter in response to one or more indicators satisfying a corresponding threshold. The apparatus may also include means for decoding speech configured to generate processed speech signals based on the first frame data and the second frame data. For example, the means for decoding speech may include or correspond to the speech decoder 160 of FIG. 1, the speech decoder 956 of FIG. 9, the vocoder decoder 1338 of FIG. 13, or a combination thereof. In an illustrative embodiment, the means for decoding speech may further perform the function of uncompressing the first frame data and to generate a processed speech signal based on the uncompressed first frame data.

One or more of the disclosed aspects may be implemented in a system or an apparatus, such as the device 1300, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1300 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-13 may illustrate systems, apparatuses, and/or methods according to the teachings of the disclosure, the disclosure is not limited to these illustrated systems, apparatuses, and/or methods. One or more functions or components of any of FIGS. 1-13 as illustrated or described herein may be combined with one or more other portions of another function or component of FIGS. 1-13. Accordingly, no single example described herein should be construed as limiting and examples of the disclosure may be suitably combined without departing from the teachings of the disclosure. As an example, one or more of the methods of FIGS. 10-12, individually or in combination, may be performed by the processors 1310 of FIG. 13. To illustrate, a portion of one of the methods FIGS. 10-12 may be combined with a second portion of one of the methods of FIGS. 10-12. Additionally, one or more operations described with reference to the FIGS. 10-12 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a de-jitter buffer configured to receive a packet, the packet including first data and second data, wherein the first data includes a partial copy of first frame data corresponding to a first frame of a sequence of frames, and wherein the second data corresponds to a second frame of the sequence of frames; and an analyzer configured to, in response to receiving the packet:
generate a second frame receive timestamp associated with the second data; and
generate a first frame receive timestamp associated with the first data based on the second frame receive timestamp and based on a frame offset between the first frame and the second frame, wherein the first frame receive timestamp indicates a first time that is earlier than a second time indicated by the second frame receive timestamp.

2. The device of claim 1, further comprising:
a speech decoder configured to:
generate a first output based on the first data and the first frame receive timestamp; and
generate a second output based on the second data and the second frame receive timestamp, wherein the second frame received timestamp is generated based on a clock output.

3. The device of claim 2, wherein the speech decoder is further configured to:
generate the first output after expiration of a first buffering period that expires prior to expiration of a second buffering period associated with the second data, the expiration of the first buffering period based on the first frame receive timestamp and the expiration of the second buffering period based on the second frame receive timestamp; and
generate the second output based on the second data after the expiration of the second buffering period.

4. The device of claim 1, further comprising:
a speech decoder configured to process one or more frames in the de jitter buffer; and
a memory configured to store a generation timestamp of a particular frame that has been processed most recently by the speech decoder, and
wherein the analyzer is further configured to determine a first generation timestamp of the first frame.

5. The device of claim 4, wherein the packet indicates a second generation timestamp of the second frame, wherein the first generation timestamp is determined based on a frame offset and the second generation timestamp, and wherein the analyzer is further configured to store the first frame receive timestamp in a first buffer entry in response to determining that the first generation timestamp exceeds the generation timestamp of the particular frame.

6. A method comprising:
receiving a packet at a de-jitter buffer, the packet including first data and second data, wherein the first data includes a partial copy of first frame data corresponding to a first frame of a sequence of frames, and wherein the second data corresponds to a second frame of the sequence of frames; and
in response to receiving the packet:
generating a second frame receive timestamp associated with the second data; and
generating a first frame receive timestamp associated with the first data based on the second frame receive timestamp and based on a frame offset between the first frame and the second frame, wherein the first frame receive timestamp indicates a first time that is earlier than a second time indicated by the second frame receive timestamp.

7. The method of claim 6, further comprising:
generating a first output based on the first data and the first frame receive timestamp, and
generating a second output based on the second data and the second frame receive timestamp, wherein the second frame received timestamp is generated based on a clock output.

8. The method of claim 7, wherein the first output is generated after expiration of a first buffering period that expires prior to expiration of a second buffering period associated with the second data, wherein the expiration of the first buffering period is based on the first frame receive timestamp and the expiration of the second buffering period is based on the second frame receive timestamp, and wherein the second output is generated after the expiration of the second buffering period.

9. The method of claim 6, further comprising dual-enqueuing the packet in the de-jitter buffer, wherein dual-enqueuing the packet comprises:
storing the first data and the first frame receive timestamp in a first buffer entry of the de-jitter buffer, the first buffer entry corresponding to the first frame, and
storing the second data and the second frame receive timestamp in a second buffer entry of the de-jitter buffer, the second buffer entry corresponding to the second frame.

10. The method of claim 9, wherein storing the first frame receive timestamp in the first buffer entry enables processing of the partial copy of the first frame prior to expiration of a second buffering period corresponding to the second frame.

11. The method of claim 6, further comprising:
extending a period of silence in response to determining that the first frame is absent from the de-jitter buffer, wherein the first frame is a first frame of a talk spurt subsequent to the period of silence, and wherein the period of silence corresponds to a period with no audio input; and
processing the first frame subsequent to extending the period of silence.

12. The method of claim 6, further comprising, in response to determining that the first frame data is absent from the de jitter buffer and that the packet includes the partial copy of the first frame data:
storing a first copy of the packet at a first memory location, wherein a first buffer entry of the de-jitter buffer indicates the first memory location; and
storing a second copy of the packet at a second memory location, wherein a second buffer entry of the de-jitter buffer indicates the second memory location.

13. The method of claim 12, further comprising:
setting a first flag associated with the first buffer entry to a first value to indicate that the first buffer entry corresponds to a partial copy of data of a frame; and
setting a second flag associated with the second buffer entry to a second value to indicate that the second buffer entry corresponds to a full copy of data of a frame, and wherein the second data includes a full copy of second frame data of the second frame.

14. The method of claim 6, further comprising:
determining a first buffering period corresponding to the first frame based on the first frame receive timestamp and a particular playout delay; and
determining a second buffering period corresponding to the second frame based on the second frame receive timestamp and the particular playout delay,
wherein a first playout time of the first frame is earlier than a second playout time of the second frame.

15. The method of claim 6, further comprising, prior to receiving the packet and in response to determining that the first frame is absent from the de jitter buffer:
playing an erasure; and
updating a value of a buffer timeline.

16. The method of claim 6, further comprising:
storing the first data in a first buffer entry of the de jitter buffer, the first buffer entry corresponding to the first frame;
receiving a second packet including the first frame data; and
updating the first buffer entry of the de-jitter buffer to replace the first data with the first frame data.

17. The method of claim 16, further comprising:
storing the first frame receive timestamp in the first buffer entry of the de-jitter buffer;
determining an updated receive timestamp of the second packet; and
updating the first buffer entry to replace the first frame receive timestamp with the updated receive timestamp of the second packet.

18. The method of claim 6, further comprising:
receiving a plurality of packets;
determining at least one of a frame erasure rate, an offset value, or a frame bundling value based on the plurality of packets; and
updating a parameter associated with a buffer in response to at least one of the frame erasure rate being greater than or equal to a first threshold, the offset value being greater than or equal to a second threshold, or the frame bundling value being greater than or equal to a third threshold.

19. The method of claim 6, further comprising:
receiving a plurality of packets; and
updating a parameter associated with a buffer in response to a determination that a frame erasure rate satisfies a first threshold, an offset value satisfies a second threshold, and a frame bundling value satisfies a third threshold, wherein the frame bundling value is based on the plurality of packets.

20. The method of claim 19, wherein updating the parameter comprises changing a value of the parameter from a first value to a second value, and further comprising, after the parameter is updated, changing the value of the parameter from the second value to the first value in response to the frame erasure rate being less than the first threshold, the offset value being less than the second threshold, or the frame bundling value being less than the third threshold.

21. A non-transitory computer-readable storage device storing instructions that, when executed by a processor, cause the processor to perform operations comprising:
processing a packet at a de-jitter buffer, the packet including first data and second data, wherein the first data includes a partial copy of first frame data corresponding to a first frame of a sequence of frames, and wherein the second data corresponds to a second frame of the sequence of frames; and
in response to processing the packet:
generate a second frame receive timestamp associated with the second data; and
generate a first frame receive timestamp associated with the first data based on the second frame receive timestamp and based on a frame offset between the first frame and the second frame, wherein the first frame receive timestamp indicates a first time that is earlier than a second time indicated by the second frame receive timestamp.

22. The computer-readable storage device of claim 21, wherein generating the first frame receive timestamp comprises:
multiplying a frame offset by a frame playout duration to obtain a duration; and
subtracting at least the duration from the second frame receive timestamp.

23. The computer-readable storage device of claim 21, further comprising:
determining a first generation timestamp of the first frame; and
storing the first frame receive timestamp in a first buffer entry in response to determining that the first generation timestamp exceeds a generation timestamp of a previous frame of the sequence of frames, wherein the previous frame is a most recently processed frame of the sequence of frames.

24. The computer-readable storage device of claim 23, further comprising determining the previous frame is earlier in the sequence of frames than the first frame based on the first generation timestamp of the first frame exceeding the generation timestamp of the previous frame.

25. The computer-readable storage device of claim 23, wherein generating the first generation timestamp comprises:
multiplying a frame offset between the first frame and the second frame by a number of samples per frame to generate a first value; and
subtracting the first value from a second generation timestamp of the second frame, wherein the packet includes an indication of the second generation timestamp.

26. The computer-readable storage device of claim 21, wherein the packet includes an indication of a frame offset, a number of samples per frame, or both.

27. The computer-readable storage device of claim 21, wherein the operations further comprise storing the first frame receive timestamp in a first buffer entry in response to determining that the first frame is absent from the de-jitter buffer or independent of a value of a buffer timeline.

28. The computer-readable storage device of claim 21, further comprising:
generating a first output based on the first data and the first frame receive timestamp; and
generating a second output based on the second data and the second frame receive timestamp, wherein the second frame received timestamp is generated based on a clock output.

29. An apparatus comprising:
means for receiving a packet including first data and second data, wherein the first data includes a partial copy of first frame data corresponding to a first frame of a sequence of frames, and wherein the second data corresponds to a second frame of the sequence of frames; and
means for performing buffer management, comprising:
means for generating a second frame receive timestamp associated with the second data in response to receiving the packet; and
means for generating a first frame receive timestamp associated with the first data based on the second frame receive timestamp and based on a frame offset between the first frame and the second frame, wherein the first frame receive timestamp indicates a first time that is earlier than a second time indicated by the second frame receive timestamp.

30. The apparatus of claim 29, wherein the means for receiving and the means for performing buffer management are integrated into at least one of a communication device, a computer, a music player, a video player, an entertainment unit, a navigation device, a personal digital assistant (PDA), a decoder, or a set top box.

* * * * *